US006187845B1

(12) United States Patent
Renz et al.

(10) Patent No.: US 6,187,845 B1
(45) Date of Patent: *Feb. 13, 2001

(54) STABILIZED ADHESIVE COMPOSITIONS CONTAINING HIGHLY SOLUBLE, RED-SHIFTED, PHOTOSTABLE BENZOTRIAZOLE UV ABSORBERS AND LAMINATED ARTICLES DERIVED THEREFROM

(75) Inventors: Walter Renz, Brookfield, CT (US); Mervin Gale Wood, Jr., Poughquag, NY (US); Joseph Suhadolnik, Yorktown Heights, NY (US); Ramanathan Ravichandran, Nanuet, NY (US); Revathi Iyengar, Courtland Manor, NY (US)

(73) Assignee: Ciba Specialty Chemicals Corporation, Tarrytown, NY (US)

( * ) Notice: Under 35 U.S.C. 154(b), the term of this patent shall be extended for 0 days.

This patent is subject to a terminal disclaimer.

(21) Appl. No.: 09/303,583

(22) Filed: May 3, 1999

(51) Int. Cl.$^7$ ................................................. C08K 5/3472
(52) U.S. Cl. ............................................. 524/91; 548/259
(58) Field of Search ............................... 524/91; 548/259

(56) References Cited

U.S. PATENT DOCUMENTS

| | | | |
|---|---|---|---|
| 3,004,896 | 10/1961 | Heller et al. | 167/90 |
| 3,055,896 | 9/1962 | Boyle et al. | 544/209 |
| 3,072,585 | 1/1963 | Milionis et al. | 525/7 |
| 3,074,910 | 1/1963 | Dickson, Jr. | 524/91 |
| 3,189,615 | 6/1965 | Heller et al. | 548/260 |
| 3,218,332 | 11/1965 | Heller et al. | 548/259 |
| 3,230,194 | 1/1966 | Boyle | 524/91 |
| 3,290,203 | 12/1966 | Antonson et al. | 161/4 |
| 3,629,191 | 12/1971 | Heller et al. | 524/91 |
| 3,681,179 | 8/1972 | Theissen | 161/4 |
| 3,776,805 | 12/1973 | Hansen | 161/2 |
| 3,823,112 | 7/1974 | Ponder | 524/91 |
| 3,992,339 | 11/1976 | Harlan, Jr. et al. | 524/91 |
| 4,095,013 | 6/1978 | Burger | 428/522 |
| 4,127,586 | 11/1978 | Rody et al. | 548/260 |
| 4,206,111 | 6/1980 | Valdiserri et al. | 524/91 |
| 4,226,763 | 10/1980 | Dexter et al. | 524/91 |
| 4,278,589 | 7/1981 | Dexter et al. | 524/91 |
| 4,278,590 | 7/1981 | Dexter et al. | 524/91 |
| 4,315,848 | 2/1982 | Dexter et al. | 524/91 |
| 4,383,863 | 5/1983 | Dexter et al. | 106/150.1 |
| 4,645,714 | 2/1987 | Roche et al. | 428/458 |
| 4,657,803 | 4/1987 | Pernicano | 428/200 |
| 4,675,352 | 6/1987 | Winter et al. | 524/91 |
| 4,681,905 | 7/1987 | Kubota et al. | 524/91 |
| 4,684,680 | 8/1987 | Kubota et al. | 524/91 |
| 4,760,148 | 7/1988 | Seltzer et al. | 524/91 |
| 4,776,913 | 10/1988 | Goossens et al. | 156/230 |
| 4,853,471 | 8/1989 | Rody et al. | 548/261 |
| 4,871,784 | 10/1989 | Otonari et al. | 521/138 |

(List continued on next page.)

FOREIGN PATENT DOCUMENTS

| | | |
|---|---|---|
| 0355962 | 2/1990 | (EP) . |
| 0752612 | 1/1997 | (EP) . |
| 2012668 | 8/1979 | (GB) . |
| 177072 | 9/1985 | (JP) ........................................ 524/91 |
| 158752 | 7/1987 | (JP) ........................................ 524/91 |
| 22849 | 1/1988 | (JP) ........................................ 524/91 |
| 51542 | 2/1990 | (JP) ........................................ 524/91 |
| 95003217 | 1/1995 | (JP) . |
| 96143831 | 6/1996 | (JP) . |
| 98/34981 | 8/1989 | (WO) . |
| 92/01557 | 2/1992 | (WO) . |
| 97/32225 | 9/1997 | (WO) . |
| 97/42261 | 11/1997 | (WO) . |

OTHER PUBLICATIONS

Kirk–Othmer, Encylcopedia of Chemical Technology, 3$^{rd}$. Ed., vol. 1, Wiley–Interscience, New York, 1978, pp. 490–491.
Kirk–Othmer, vol., 4$^{th}$ Ed. pp. 445–446; vol. 6, p. 606; Ullmann, vol., A1, 5$^{th}$ Ed., p. 222; and vol. A18, p. 364.
Residential Windows by John Carmody, Stephen Selkowitz and Lisa Heschong, W. W. Norton & Co., New York, 1996, pp. 149–150.
J. Scheirs, et al., Polymer Degradation Stability, 56(3), 339 (1997).
Business Communications Co., Sep. 1996 Examples of Solar Films and Commercial Benefits.
U.S. Department of Energy report on "Spectrally Selective Glazings".
U.S. News & World Report, Sep. 14, 1998, p. 50.
Courtaulds Performance Films, Inc.—LLUMAR® UV shield window film.
Derwent Abstr. 94–238171 [29].
Derwent Abstr. 92–145092/18.
Derwent Abstr. 96–074587/08.
Derwent Abstr. 92–295231/36.
Derwent Abstr. 91991 D/50.
Derwent Abstr. 93–400473/50.
Derwent Abstr. 84117X/45.
Derwent Abstr. 95–078227/11.
Derwent Abstr. 92–295510/36.
Nagashima et al., Journal of Non–Crystalline Solids, 178, (1994), pp. 182–188.

*Primary Examiner*—Peter A. Szekely
(74) *Attorney, Agent, or Firm*—Luther A. R. Hall

(57) ABSTRACT

Adhesive compositions are rendered stable against degradation caused by ultraviolet light through the incorporation of selected highly soluble, red-shifted, photostable benzotriazole UV absorbers which absorb light strongly in the 350 to 400 nm range. These UV absorbers exhibit excellent photostability and are highly soluble in adhesive formulations. The laminated articles derived from these compositions include, for example, solar control films, films and glazings, UV absorbing glasses and glass coatings, windscreens, retroreflective sheetings and signs, solar reflectors, optical films and the like.

17 Claims, No Drawings

U.S. PATENT DOCUMENTS

| | | | |
|---|---|---|---|
| 4,891,396 | 1/1990 | Avar et al. | 524/91 |
| 4,963,636 * | 10/1990 | Mulhaupt et al. | 528/28 |
| 5,001,177 | 3/1991 | Winfried et al. | 524/91 |
| 5,032,498 | 7/1991 | Rody et al. | 524/91 |
| 5,095,062 | 3/1992 | Winter et al. | 524/91 |
| 5,160,787 * | 11/1992 | Gaku et al. | 428/333 |
| 5,204,390 * | 4/1993 | Szymanski et al. | 524/91 |
| 5,217,794 | 6/1993 | Schrenk | 428/220 |
| 5,239,406 | 8/1993 | Lynam | 359/275 |
| 5,268,450 | 12/1993 | DesLauriers et al. | 528/388 |
| 5,278,314 * | 1/1994 | Winter et al. | 548/259 |
| 5,280,124 | 1/1994 | Winter et al. | 548/259 |
| 5,294,473 | 3/1994 | Kawamoto | 428/141 |
| 5,319,091 | 6/1994 | DesLauriers et al. | 548/259 |
| 5,360,850 * | 11/1994 | Moshchitsky et al. | 524/91 |
| 5,372,889 | 12/1994 | Harisiades et al. | 428/429 |
| 5,387,458 | 2/1995 | Pavelka et al. | 428/141 |
| 5,410,071 | 4/1995 | DesLauriers et al. | 548/259 |
| 5,426,204 | 6/1995 | Harisiades et al. | 556/419 |
| 5,436,349 * | 7/1995 | Winter et al. | 548/259 |
| 5,516,914 * | 5/1996 | Winter et al. | 548/259 |
| 5,523,877 | 6/1996 | Lynam | 359/275 |
| 5,564,843 | 10/1996 | Kawaguchi | 400/208 |
| 5,607,987 * | 3/1997 | Winter et al. | 524/91 |
| 5,618,626 | 4/1997 | Nagashima et al. | 428/429 |
| 5,618,863 | 4/1997 | D'Errico et al. | 524/91 |
| 5,643,676 * | 7/1997 | Dobashi et al. | 428/411.1 |
| 5,683,804 | 11/1997 | Nagashima et al. | 428/336 |
| 5,770,114 | 6/1998 | Byker et al. | 252/583 |
| 5,926,248 * | 7/1999 | Tucker | 351/44 |
| 5,977,219 * | 11/1999 | Ravichandran et al. | 524/91 |
| 6,037,060 * | 3/2000 | Blohowiak et al. | 428/450 |

* cited by examiner

STABILIZED ADHESIVE COMPOSITIONS CONTAINING HIGHLY SOLUBLE, RED-SHIFTED, PHOTOSTABLE BENZOTRIAZOLE UV ABSORBERS AND LAMINATED ARTICLES DERIVED THEREFROM

This invention pertains to stabilized adhesive compositions containing an effective amount of a benzotriazole UV absorber having enhanced solubility, durability and absorption in the 350 to 400 nm range.

BACKGROUND OF THE INVENTION

Adhesives are made up of various components such as polymers, tackifiers, waxes and oils. Adhesive formulations based on these ingredients are susceptible to degradation. The consequences of degradation are discoloration, loss of elongation, loss of tensile strength, loss of tack and change in viscosity, molecular weight and molecular weight distribution. Degradation can be caused by prolonged exposure to sunlight. Sunlight contains invisible ultraviolet (UV) radiation with wavelengths between 290 and 400 nm. This radiation is responsible for the initiation of photodegradation.

Absorption of UV light by chromophores present in the adhesive formulation transforms the chromophores into their excited states which can undergo further undesired reactions. Some polymers contain strongly absorbing chromophores as a major part of their structures. Other polymers contain unintentional impurities such as ketones and hydroperoxide moieties and catalyst residues which act as chromophores. Absorption of UV radiation by these chromophores eventually results in bond cleavage, chain scission and/or crosslinking reactions.

Photostabilization of adhesives can be achieved by the addition of UV absorbers which convert the absorbed energy into harmless heat. An ideal UV absorber should be extremely photostable and have strong absorption over the UV range from 290 to 400 nm, but particularly the range of 350 to 400 nm. Classes of UV absorbers include the salicylates, cyanoacrylates, malonates, oxanilides, benzophenones, s-tiazines and benzotriazoles.

Salicylates, cyanoacrylates, malonates and oxanilides absorb UV light primarily at the lower wavelengths of the UV range. These compounds have little to no absorption in the range of 350 to 400 nm which make them unsuitable for the instant applications. Benzophenones absorb over the lower half of the UV range, and they tend to be prone to yellowing upon light exposure due to photodegradation. Recently, it has been shown photochemically that benzophenones decompose prematurely in ethylene-vinyl acetate encapsulants which lead to the production of polyenic chromophores. This color generation from light yellow to brown is not only highly undesirable and unsightly in adhesive systems, but also can results in a loss of adhesive properties. By contrast, selected benzotriazole UV absorbers are particularly useful because of their increased photostability.

Some polymers such as polycarbonates, polyesters and aromatic polyurethanes contain strongly absorbing chromophores as a major and integral part of their structures. Poly(ethylene terephthalate) (PET) and poly(ethylene 2,6-naphthalenedicarboxylate) (PEN) are particular examples the latter of which absorbs into the red UV region and especially need red-shifted benzotriazoles for UV protection. U.S. Pat. No. 5,294,473 and WO 98/34981 teach the use of coatings containing UV absorbers including some benzotriazoles in stabilizing PEN films. Adding an adhesive UV screening layer containing the benzotriazoles, especially those described in the instant invention, further protects such polymers in multilayered constructions and articles.

The description, preparation and uses of the 2H-benzotriazole UV absorbers are described in U.S. Pat. Nos. 3,004,896; 3,055,896; 3,072,585; 3,074,910; 3,189,615; 3,230,194; 4,127,586; 4,226,763; 4,278,589; 4,315,848; 4,383,863; 4,675,352; 4,681,905 and 4,853,471.

Although benzotriazoles with just hydrogen at the 5-position of the benzo ring are photostable and useful in adhesive formulations, they lack a red-shifted absorbance toward longer UV wavelengths which would be most useful in giving added protection to the substrates. U.S. Pat. Nos. 5,319,091 and 5,410,071 described the preparation of benzotriazoles substituted at the 5-position of the benzo ring with alkyl- or aryl-sulfonyl moieties. It is taught in U.S. Pat. No. 5,280,124 that by introducing a higher alkyl or aryl sulfoxide or sulfone at the 5-position of the benzo ring of the benzotriazole, the resulting benzotriazole exhibits enhanced absorption in the near visible range (over 350 nm). Such sulfone substituted products were shown to be useful in automotive coatings applications. Copending patent applications Ser. Nos. 08/961,127 and 09/234,880 teach that an electron withdrawing moiety at the 5-position of the benzo ring of the benzotriazole is advantageous for similar reasons. Additionally, these copending patent applications teach that such an electron withdrawing group dramatically increases the photostability of these benzotriazole UV absorbers in automotive coatings. Quite surprisingly, these red-shifted benzotriazoles are amazingly soluble in adhesives making them especially well-suited for the instant applications.

It is known in the art that the concomitant use of a hindered amine light stabilizer with a UV absorber such as a benzotriazole provides excellent stabilization in many polymer compositions as summarized by G. Berner and M. Rembold, "New Light Stabilizers for High Solids Coatings", Organic Coatings and Science and Technology, Vol. 6, Dekkar, New York, pp 55–85.

The benzotriazole UV absorbers represent a special class of commercial UV absorbers as described above. Only a few references refer to substitution on the benzo ring by an aryl or alkyl sulfoxide or sulfonyl moiety.

U.S. Pat. No. 3,218,332 discloses benzotriazoles substituted at the 5-position of the benzo ring by a lower alkyl sulfonyl moiety. However, this patent deals with putting reactable groups, namely alkenyl groups, at the 3-position on the phenyl ring and is of little relevance to the instant application. U.S. Pat. Nos. 5,268,450 and 5,319,091 disclose polymer compositions and a process for the production of substituted aryl thio and aryl sulfonyl benzotriazoles which are covalently bound to polymers, such as poly(phenylene sulfide), RYTON®, Phillips Petroleum. U.S. Pat. No. 5,280,124 discloses benzotriazoles with only higher alkyl or aryl sulfonyl or sulfonyl moieties at the 5-position of the benzo ring which are useful for protecting thermoset automotive coatings. The copending patent applications mentioned above teach the use of certain electron withdrawing groups including some sulfonyl groups at the 5-position of the benzo ring for the stabilization of automotive coatings.

Japanese Patent No. 92-352228 discloses the use of 5-ethylsulfonyl benzotriazoles with the 3-position of the phenyl ring being unsubstituted or substituted by methyl for the UV protection of dust proof poly(vinyl chloride) resin films. These compounds when studied in the instant adhesive compositions were found to be quite insoluble and totally useless for the instant adhesive compositions. By contrast, when a tertiary alkyl group is inserted at the 3-position of the phenyl ring, the solubility of the thus substituted benzotriazole in adhesive composition is surprisingly enhanced.

The instant compounds exhibit enhanced broadened absorption characteristics particularly in the long wavelength UV region (over 350 nm) when compared with compounds of the prior art. Additionally, the instant compounds have surprising and unexpectedly high solubility in adhesives making them especially well suited for use in adhesive formulations.

The effect of UV light on laminated articles that are exposed to the sun or other sources of UV light are of great concern to the manufacturers of such articles. Over time, constant or repeated exposure to UV light can result in dye and/or pigment fade for dyes and/or pigments used in such articles and in the degradation or breakdown of the adhesives, polymers or other materials used in the construction of the articles. The aforementioned fading and degradation shorten the useful life of the articles in question, making protection from UV light exposure an issue of great importance to the manufacturers of such articles.

Molecules known as UV absorbers are generally known in the art. However, due to the differences discussed above between the various UV absorber classes, it is the benzotriazoles and articles containing them which will be discussed here. Due to the incompatibility and low solubility of certain benzotriazoles, a need exists for selected benzotriazoles that are highly soluble and which would provide added protection in the 350 to 400 nm region of the ultraviolet. T. Nagashima et al., J. Non-Cryst. Solids, 178 (1994), 182, report "Recently ultraviolet light (UV) shielding glass, which is UV absorbing over the range of long wavelengths (320–400 nm) to avoid sunburn effects, has become an important issue because of the possible hazard of skin cancer due to depletion of the ozone layer."

In addition, articles which incorporate the selected benzotriazoles of the instant invention are useful in protecting interior structures, textiles and fabrics from UV induced photodegradation such as in automotive applications.

International application WO 97/32225 describes the use of PEN films having reflective and polarizing elements for use as optical films.

U.S. Pat. No. 5,770,114 discloses stabilized compositions containing soluble benzotriazoles that are used in electrochromic devices. However, these benzotriazoles lack the red-shifted absorption at the 350 to 400 nm region.

Articles which would benefit from the incorporation of the instant, highly soluble, photostable and red-shifted benzotriazoles include, but are not limited to:

(a) Retroreflective Sheets and Signs and Conformable Marketing Sheets as seen in WO 97/42261; and U.S. Pat. No. 5,387,458 which is incorporated herein by reference;

(b) Solar Control Films of Various Construction as seen in British 2,012,668; European 355,962; and U.S. Pat. Nos. 3,290,203; 3,681,179; 3,776,805 and 4,095,013 which are incorporated herein by reference;

(c) Corrosion Resistant Silver Mirrors and Solar Reflectors as seen in U.S. Pat. No. 4,645,714 which is incorporated herein by reference;

(d) Reflective Print Labels as seen in U.S. Pat. No. 5,564,843 which is incorporated herein by reference;

(e) UV Absorbing Glasses and Glass Coatings as seen in U.S. Pat. Nos. 5,372,889; 5,426,204; 5,683,804 and 5,618,626 which are incorporated herein by reference;

(f) Electrochromic Devices as seen in European 752,612 Al; and U.S. Pat. Nos. 5,239,406; 5,523,877 and 5,770,114 which are incorporated herein by reference;

(g) Films/Glazings as seen in WO 92/01557; Japanese Nos. 75-33286; 93-143668; 95-3217 and 96-143831; and U.S. Pat. No. 5,643,676 which is incorporated herein by reference;

(h) Windscreens and Intermediate Layers as seen in Japanese Nos. 80-40018; 90-192118; 90-335037; 90-335038; 92-110128 and 94-127591; and U.S. Pat. No. 5,618,863 which is incorporated herein by reference; and (i) Optical Films as seen in WO 97/32225; and U.S. Pat. Nos. 4,871,784 and 5,217,794 which are incorporated herein by reference.

DETAILED DISCLOSURE

The general embodiment of the instant invention is to a stabilized adhesive composition, suitable for use as an adhesive layer in a laminated article or multilayer construction, which comprises (a) an adhesive; and (b) an effective stabilizing amount of a highly soluble, red-shifted, photostable benzotriazole.

More particularly, the adhesive of component (a) is selected from the group consisting of the pressure sensitive adhesives, the rubber-based adhesives, the solvent or emulsion based adhesives, the hot melt adhesives and natural-product based adhesives. These adhesives are selected from the group consisting of the polyurethanes, polyacrylics, epoxys, phenolics, polyimides, poly(vinyl butyral), polycyanoacrylates, polyacrylates, ethylene/acrylic acid copolymers and their salts (ionomers), silicon polymers, poly(ethylene/vinyl acetate), atatic polypropylene, styrene-diene copolymers, polyamides, hydroxyl-terminated polybutadiene, polychloroprene, poly(vinyl acetate), carboxylated styrene/butadiene copolymers and poly(vinyl alcohol).

More particularly, the highly soluble, red-shifted, photostable benzotriazole is of formula I, II or III

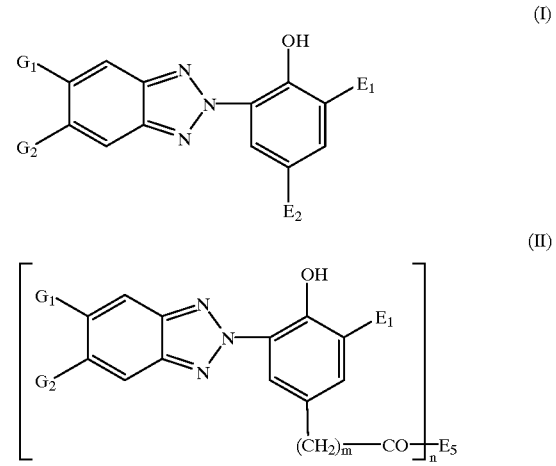

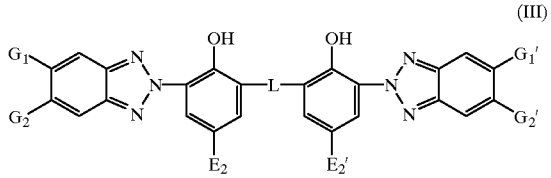

(III)

wherein $G_1$ and $G_1'$ are independently hydrogen or halogen, $G_2$ and $G_2'$ are independently halogen, nitro, cyano, perfluoroalkyl of 1 to 12 carbon atoms, —COOG$_3$, —P(O)(C$_6$H$_5$)$_2$, —CO—G$_3$, —CO—NH—G$_3$, —CO—N(G$_3$)$_2$, —N(G$_3$)—CO—G$_3$, E$_3$SO— or E$_3$SO$_2$—; or $G_2'$ is also hydrogen, $G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $G_6$ is perfluoroalkyl of 1 to 12 carbon atoms, $G_7$ is hydrogen or perfluoroalkyl of 1 to 12 carbon atoms, $E_1$ is hydrogen, straight or branched chain alkyl of 1 to 24 carbon atoms, straight or branched chain alkenyl of 2 to 24 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or $E_1$ is alkyl of 1 to 24 carbon atoms substituted by one or two hydroxy groups, $E_2$ and $E2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms; or $E_2$ and $E2'$ are independently said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where $E_4$ is straight or branched chain alkyl of 1 to 24 carbon atoms; or said alkyl or said alkenyl interrupted by one or more —O—, —NH— or —NE$_4$— groups or mixtures thereof and which can be unsubstituted or substituted by one or more —OH, —OE$_4$ or —NH$_2$ groups or mixtures thereof;

n is 1 or 2, when n is 1, $E_5$ is OE$_6$ or NE$_7$E$_8$, or $E_5$ is —PO(OE$_{12}$)$_2$, —OSi(E$_{11}$)$_3$ or —OCO—E$_{11}$, or straight or branched chain C$_1$–C$_{24}$alkyl which is interrupted by —O—, —S— or —NE$_{11}$ and which can be unsubstituted or substituted by —OH or —OCO—E$_{11}$, C$_5$–C$_{12}$ cycloalkyl which is unsubstituted or substituted by —OH, straight chain or branched C$_2$–C$_{18}$alkenyl which is unsubstituted or substituted by —OH, C$_7$–C$_{15}$aralkyl, —CH$_2$—CHOH—E$_{13}$ or glycidyl, $E_6$ is hydrogen, straight or branched chain C$_1$–C$_{24}$alkyl which is unsubstituted or substituted by one or more OH, OE$_4$ or NH$_2$ groups, or —OE$_6$ is —(OCH$_2$CH$_2$)$_w$OH or —(OCH$_2$CH$_2$)$_w$OE$_{21}$ where w is 1 to 12 and $E_{21}$ is alkyl of 1 to 12 carbon atoms, $E_7$ and $E_8$ are independently hydrogen, alkyl of 1 to 18 carbon atoms, straight or branched chain C$_3$–C$_{18}$alkyl which is interrupted by —O—, —S— or —NE$_{11}$—, C$_5$–C$_{12}$cycloalkyl, C$_6$–C$_{14}$aryl or C$_1$–C$_3$hydroxylalkyl, or $E_7$ and $E_8$ together with the N atom are a pyrrolidine, piperidine, piperazine or morpholine ring, $E_5$ is —X—(Z)$_p$—Y—E$_{15}$ wherein X is —O— or —N(E$_{16}$)—, Y is —O— or —N(E$_{17}$)—, Z is C$_2$–C$_{12}$-alkylene, C$_4$–C$_{12}$-alkylene interrupted by one to three nitrogen atoms, oxygen atoms or a mixture thereof, or is C$_3$–C$_{12}$-alkylene, butenylene, butynylene, cyclohexylene or phenylene, each substituted by a hydroxyl group, m is zero, 1 or 2, p is 1, or p is also zero when X and Y are —N(E$_{16}$)— and —N(E$_{17}$)—, respectively, $E_{15}$ is a group —CO—C(E$_{18}$)=C(H)E$_{19}$ or, when Y is —N(E$_{17}$)—, forms together with E$_{17}$ a group —CO—CH=CH—CO—, wherein $E_{18}$ is hydrogen or methyl, and $E_{19}$ is hydrogen, methyl or —CO—X—E$_{20}$, wherein $E_{20}$ is hydrogen, C$_1$–C$_{12}$-alkyl or a group of the formula

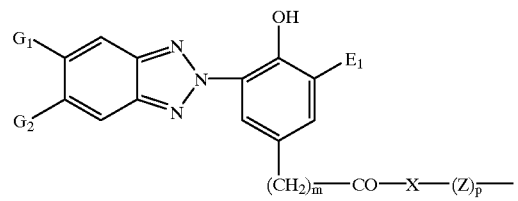

wherein the symbols $E_1$, $G_2$, X, Z, m and p have the meanings defined above, and $E_{16}$ and $E_{17}$ independently of one another are hydrogen, C$_1$–C$_{12}$-alkyl, C$_3$–C$_{12}$alkyl interrupted by 1 to 3 oxygen atoms, or is cyclohexyl or C$_7$–C$_{15}$aralkyl, and $E_{16}$ together with $E_{17}$ in the case where Z is ethylene, also forms ethylene, when n is 2, $E_5$ is one of divalent radicals —O—E$_9$—O— or —N(E$_{11}$)—E$_{10}$—N(E$_{11}$)—, $E_9$ is C$_2$–C$_8$alkylene, C$_4$–C$_8$alkenylene, C$_4$alkynylene, cyclohexylene, straight or branched chain C$_4$–C$_{10}$alkylene which is interrupted by —O— or by —CH$_2$—CHOH—CH$_2$—O—E$_{14}$—O—CH$_2$—CHOH—CH$_2$—, $E_{10}$ being straight or branched chain C$_2$–C$_{12}$alkylene which may be interrupted by —O—, clohexylene, or

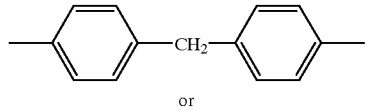

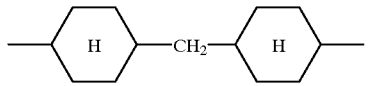

or $E_{10}$ and $E_{11}$ with the two nitrogen atoms form a piperazine ring, $E_{14}$ is straight or branched chain C$_2$–C$_8$alkylene, straight or branched chain C$_4$–C$_{10}$alkylene which is interrupted by —O—, cycloalkylene, arylene or

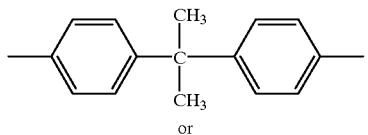

or

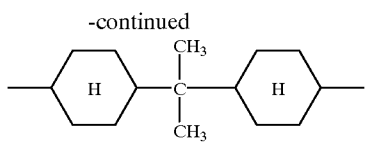

where $E_7$ and $E_8$ are independently hydrogen, alkyl of 1 to 18 carbon atoms or $E_7$ and $E_8$ together are alkylene of 4 to 6 carbon atoms, 3-oxapentamethylene, 3-iminopentamethylene or 3-methyliminopentamethylene, $E_{11}$ is hydrogen, straight or branched chain $C_1$–$C_{18}$alkyl, $C_5$–$C_{12}$cycloalkyl, straight or branched chain $C_2$–$C_{18}$alkenyl, $C_6$–$C_{14}$aryl or $C_7$–$C_{15}$aralkyl, $E_{12}$ is straight or branched chain $C_1$–$C_{18}$alkyl, straight or branched chain $C_3$–$C_{18}$alkenyl, $C_5$–$C_{10}$cycloalkyl, $C_6$–$C_{16}$aryl or $C_7$–$C_{15}$aralkyl, $E_{13}$ is H, straight chain or branched $C_1$–$C_{18}$alkyl which is substituted by —PO($OE_{12}$)$_2$, phenyl which is unsubstituted or substituted by OH, $C_7$–$C_{15}$aralkyl or —CH$_2$OE$_{12}$, $E_3$ is alkyl of 1 to 20 carbon atoms, hydroxyalkyl of 2 to 20 carbon atoms, alkyl substituted by alkoxycarbonyl of 2 to 9 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, and L is alkylene of 1 to 12 carbon atoms, aikylidene of 2 to 12 carbon atoms, benzylidene, p-xylylene, α,α,α',α'-tetramethyl-m-xylylene or cycloalkylidene; and with the proviso that formula I does not represent 5-ethylsulfonyl-2-(2-hydroxy-5-methylphenyl)-2H-benzotriazole; 5-fluoro-2-(2-hydroxy-3-a-cumyl-5-tert-octylphenyl)-2H-benzotriazole; 5-fluoro-2-(2-hydroxy-3-α-cumyl-5-tert-butylphenyl)-2H-benzotriazole; 5-chloro-2-(2-hydroxy-3-α-cumyl-5-tert-octylphenyl)-2H-benzotriazole; 5-chloro-2-(2-hydroxy-3-α-cumyl-5-tert-butylphenyl)-2H-benzotriazole; 5-chloro-2-(2-hydroxy-3,5-di-tert-butylphenyl)-2H-benzotriazole; or 5-chloro-2-(2-hydroxy-3-tert-butyl-5-methylphenyl)-2H-benzotriazole; and with the further proviso that the benzotiazole of formula I, II or mH exhibits enhanced durability and low loss of absorbance when exposed to actinic radiation as witnessed by an absorbance loss of less than 0.5 absorbance units after exposure for 893 hours or less than 0.8 absorbance units after exposure for 1338 hours in a Xenon Arc Weather-Ometer.

More particularly, the compound of formula I is

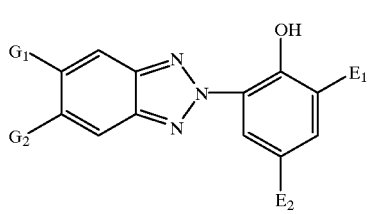

(I)

wherein
$G_1$ is hydrogen,
$G_2$ is cyano, chloro, fluoro, CF$_3$—, —CO—G$_3$, E$_3$SO— or E$_3$SO$_2$—,
$G_3$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where $E_4$ is straight or branched chain alkyl of 1 to 24 carbon atoms; or said alkyl or said alkenyl interrupted by one or more —O—, —NH— or —NE$_4$— groups or mixtures thereof and which can be unsubstituted or substituted by one or more —OH, —OE$_4$ or —NH$_2$ groups or mixtures thereof;

$E_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms; or is a compound of formula I wherein,
$G_1$ is hydrogen,
$G_2$ is chloro, fluoro, CF$_3$—, E$_3$SO— or E$_3$SO$_2$—,
$E_1$ is hydrogen or straight or branched alkyl of 1 to 24 carbon atoms,
$E_2$ is as defined above, and
$E_3$ is straight or branched chain alkyl of 1 to 7 carbon atoms; and with the proviso that formula I does not represent 5-ethylsulfonyl-2-(2-hydroxy-5-methylphenyl)-2H-benzotriazole; 5-fluoro-2-(2-hydroxy-3-α-cumyl-5-tert-octylphenyl)-2H-benzotriazole; 5-fluoro-2-(2-hydroxy-3-α-cumyl-5-tert-butylphenyl)-2H-benzotriazole; 5-chloro-2-(2-hydroxy-3-α-cumyl-5-tert-octylphenyl)-2H-benzotriazole; 5-chloro-2-(2-hydroxy-3-α-cumyl-5-tert-butylphenyl)-2H-benzotiiazole; 5-chloro-2-(2-hydroxy-3,5-di-tert-butylphenyl)-2H-benzotriazole; or 5-chloro-2-(2-hydroxy-3-tert-butyl-5-methylphenyl)-2H-benzotriazole; and with the further proviso that the benzotriazole of formula I exhibits enhanced durability and low loss of absorbance when exposed to actinic radiation as witnessed by an absorbance loss of less than 0.5 absorbance units after exposure for 893 hours or less than 0.8 absorbance units after exposure for 1338 hours in a Xenon Arc Weather-Ometer.

Another preferred embodiment is where the benzotriazole is of formula IIA

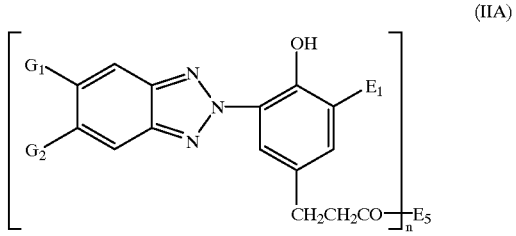

(IIA)

wherein
  $G_1$ is hydrogen,
  $G_2$ is $CF_3$— or fluoro,
  $E_1$ is hydrogen, straight or branched alkyl of 1 to 24 carbon atoms or phenylalkyl of 7 to 15 carbon atoms,
  $E_5$ is —$OE_6$ or —$NE_7E_8$, or
  $E_5$ is —X—(Z)$_p$—Y—$E_{15}$ wherein
  X is —O— or —N($E_{16}$)—,
  Y is —O— or —N($E_{17}$)—,
  Z is $C_2$–$C_{12}$-alkylene, $C_4$–$C_{12}$-alkylene interrupted by one to three nitrogen atoms, oxygen atoms or a mixture thereof, or is $C_3$–$C_{12}$-alkylene, butenylene, butynylene, cyclohexylene or phenylene, each substituted by a hydroxyl group,
  m is 0, 1, 2 or 3,
  p is 1, or p is also zero when X and Y are —N($E_{16}$)— and —N($E_{17}$)—, respectively,
  $E_{15}$ is a group —CO—C($E_{18}$)=C(H)$E_{19}$ or, when Y is —N($E_{17}$)—, forms together with $E_{17}$ a group —CO—CH=CH—CO—, wherein $E_{18}$ is hydrogen or methyl, and $E_{19}$ is hydrogen, methyl or —CO—X—$E_{20}$, wherein $E_{20}$ is hydrogen, $C_1$–$C_{12}$-alkyl or a group of the formula.

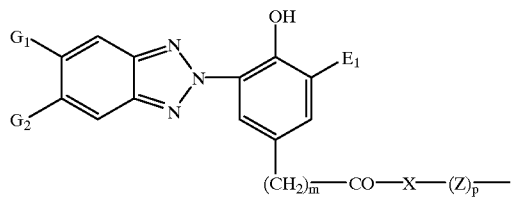

Still another preferred embodiment is a benzotriazole of formula IIIA wherein
  $G_6$ is $CF_3$,
  $G_7$ is hydrogen or $CF_3$,
  $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and
  L is alkylene of 1 to 12 carbon atoms, alkylidene of 2 to 12 carbon atoms, benzylidene, p-xylylene, α,α,α',α'-tetramethyl-m-xylylene or cycloalkylidene.

In a more preferred embodiment, the benzotriazole is of formula I

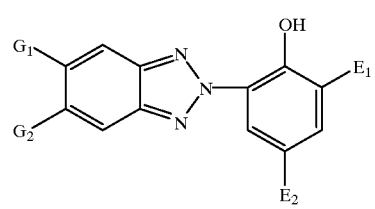

(I)

wherein
  $G_6$ is hydrogen,
  $G_2$ is $CF_3$—,
  $E_1$ is phenylalkyl of 7 to 15 carbon atoms, phenyl, or said phenyl or said phenylalkyl substituted on the phenyl ring by 1 to 4 alkyl of 1 to 4 carbon atoms,
  $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCO$E_{11}$, —NH$_2$ or —NHCOE$_{11}$, or mixtures thereof, or said alkyl or said alkenyl interrupted by one or more —O— and which can be unsubstituted or substituted by one or more —OH, or is a compound of formula I wherein,
  $G_1$ is hydrogen,
  $G_2$ is $CF_3$—,
  $E_1$ is hydrogen, straight or branched alkyl of 4 to 24 carbon atoms or phenylalkyl of 7 to 15 carbon atoms, and
  $E_2$ is as defined above.

In another preferred embodiment, the benzotriazole is of formula IIA

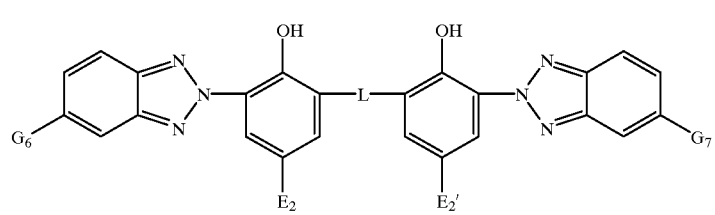

(IIIA)

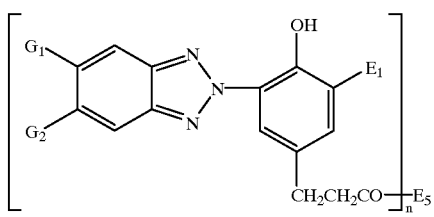

wherein
G₁ is hydrogen,
G₂ is $CF_3$—,
E₁ is hydrogen, straight or branched alkyl of 4 to 24 carbon atoms or phenylalkyl of 7 to 15 carbon atoms,
E₅ is —$OE_6$ or —$NE_7E_8$ where
E₆ is hydrogen, straight or branched chain $C_1$–$C_{24}$alkyl which is unsubstituted or substituted by one or more OH groups, or —$OE_6$ is —$(OCH_2CH_2)_wOH$ or —$(OCH_2CH_2)_wOE_{21}$ where w is 1 to 12 and $E_{21}$ is alkyl of 1 to 12 carbon atoms, and
E₇ and E₈ are independently hydrogen, alkyl of 1 to 18 carbon atoms, straight or branched chain $C_3$–$C_{18}$alkyl which is interrupted by —O—, —S— or —$NE_{11}$—, $C_5$–$C_{12}$cycloalkyl, $C_6$–$C_{14}$aryl or $C_1$–$C_3$hydroxylalkyl, or E₇ and E₈ together with the N atom are a pyrrolidine, piperidine, piperazine or morpholine ring.

In an especially preferred embodiment, the benzotriazole is of formula IIIA (g) methyl 3-(5-trifluoromethyl-2H-benzotriazol-2-yl)-5-tert-butyl-4-hydroxy-hydrocinnamate;
(h) isooctyl 3-(5-trifluoromethyl-2H-benzotriazol-2-yl)-5-tert-butyl-4-hydroxy-hydrocinnamate;
(i) 5-trifluoromethyl-2-[2-hydroxy-5-(3-hydroxypropyl) phenyl]-2H-benzotriazole;
(j) 5-butylsulfonyl-2-(2-hydroxy-3-α-cumyl-5-tert-octylphenyl)-2H-benzotriazole;
(k) 5-octylsulfonyl-2-(2-hydroxy-3,5-di-α-cumylphenyl)-2H-benzotriazole;
(l) 5-dodecylsulfonyl-2-(2-hydroxy-3,5-di-tert-butylphenyl)-2H-benzotriazole;
(m) 5-octylsulfonyl-2-(2-hydroxy-3,5-di-tert-octylphenyl)-2H-benzotriazole;
(n) 5-trifluorometbyl-2-(2-hydroxy-3-α-cumyl-5-tert-butylphenyl)-2H-benzo-triazole;
(o) 5-trifluoromethyl-2-(2-hydroxy-3-α-cumyl-5-nonylphenyl)-2H-benzotriazole;
(p) 5-trifluoromethyl-2-[2-hydroxy-3-α-cumyl-5-(2-hydroxyethyl)phenyl]-2H-benzotriazole;
(q) 5-trifluoromethyl-2-[2-hydroxy-3-α-cumyl-5-(3-hydroxypropyl)phenyl]-2H-benzotriazole;
(r) 5-trifluoromethyl-2-(2-hydroxy-3,5-di-tert-amylphenyl)-2H-benzotriazole;
(s) 5-trifluoromethyl-2-(2-hydroxy-3,5-di-tert-butylphenyl)-2H-benzotriazole;
(t) 5-trifluoromethyl-2-(2-hydroxy-3-dodecyl-5-methylphenyl)-2H-benzotriazole;
(u) 5-trifluoromethyl-2-[2-hydroxy-3-tert-butyl-5-(3-hydroxypropyl)phenyl]-2H-benzotriazole;

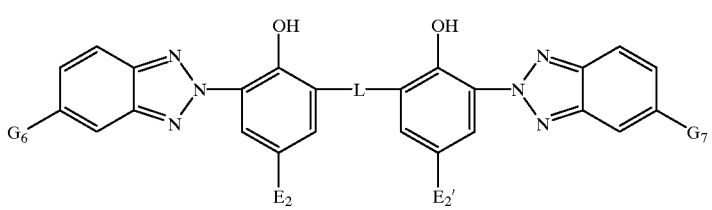

wherein
G₆ is $CF_3$,
G₇ is hydrogen or $CF_3$,
E₂ and E₂' are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and
L is methylene.

Preferably, the benzotriazole is a compound which is
(a) 5-trifluoromethyl-2-(2-hydroxy-3-α-cumyl-5-tert-octylphenyl)-2H-benzo-triazole;
(b) 5-trifluoromethyl-2-(2-hydroxy-5-tert-octylphenyl)-2H-benzotriazole;
(c) 5-trifluoromethyl-2-(2-hydroxy-3,5-di-tert-octylphenyl)-2H-benzotriazole;
(d) 2,2'-methylene-bis[6-(5-trifluoromethyl-2H-benzotriazol-2-yl)-4-tert-octyl-phenol];
(e) methylene-2-[4-tert-octyl-6-(2H-benzotriazol-2-yl) phenol]2'-[4-tert-octyl-6-(5-trifluoromethyl-2H-benzotriazol-2-yl)phenol];
(f) 3-(5-trifluoromethyl-2H-benzotriazol-2-yl)-5-tert-butyl-4-hydroxy-hydrocinnamic acid;

(v) 5-trifluoromethyl-2-[2-bydroxy-3-tert-butyl-5-(2-bydroxyethyl)phenyl]-2H-benzotriazole;
(w) 5-trifluoromethyl-2-[2-hydroxy-5-(2-hydroxyethyl) phenyl]-2H-benzotriazole;
(x) 5-trifluoromethyl-2-(2-hydroxy-3,5-di-α-cumylphenyl)-2H-benzotriazole;
(y) 5-fluoro-2-(2-bydroxy-3,5-di-α-cumylphenyl)-2H-benzotriazole;
(z) 5-butylsulfonyl-2-(2-hydroxy-3,5-di-α-cumylphenyl)-2H-benzotriazole;
(aa) 5-butylsulfonyl-2-(2-hydroxy-3,5-di-tert-butylphenyl)-2H-benzotriazole;
(bb) 5-butylsulfonyl-2-(2-bydroxy-3,5-di-tert-octylphenyl)-2H-benzotriazole;
(cc) 5-phenylsulfonyl-2-(2-hydroxy-3,5-di-tert-butylphenyl)-2H-benzotriazole; and
(dd) 5-chloro-2-(2-hydroxy-3,5-di-α-cumylphenyl)-2H-benzotriazole.

Most preferably, the benzotriazoles of especial interest are
(a) 5-trifluoromethyl-2-(2-hydroxy-3-α-cumyl-5-tert-octylphenyl)-2H-benzo-triazole;
(b) 5-trifluoromethyl-2-(2-hydroxy-5-tert-octylphenyl)-2H-benzotriazole;

(c) 5-trifluoromethyl-2-(2-hydroxy-3,5-di-tert-octylphenyl)-2H-benzotriazole;

(g) methyl 3-(5-trifluoromethyl-2H-benzotriazol-2-yl)-5-tert-butyl-4-hydroxy-hydrocinnamate;

(j) 5-butylsulfonyl-2-(2-hydroxy-3-α-cumyl-5-tent-octylphenyl)-2H-benzotriazole;

(n) 5-trifluoromethyl-2-(2-hydroxy-3-α-cumyl-5-tert-butylphenyl)-2H-benzo-triazole;

(s) 5-trifluoromethyl-2-(2-hydroxy-3,5-di-tert-butylphenyl)-2H-benzotriazole;

(x) 5-trifluoromethyl-2-(2-hydroxy-3,5-di-α-cumylphenyl)-2H-benzotriazole;

(aa) 5-butylsulfonyl-2-(2-hydroxy-3,5-di-tert-butylphenyl)-2H-benzotriazole; and (cc) 5-phenylsulfonyl-2-(2-hydroxy-3,5-di-tert-butylphenyl)-2H-benzotriazole.

The effective stabilizing amount of a benzotriazole of formula I, II or III is 0.1 to 20% by weight based on the adhesive.

The instant adhesive stabilized by a benzotriazole of formula I, II or III may also optionally contain from 0.01 to 10% by weight; preferably from 0.025 to 5% by weight, and most preferably from 0.1 to 3% by weight of additional coadditives such as antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents, blowing agents and the like.

The stabilizers of the instant invention may readily be incorporated into the adhesive compositions by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized adhesive compositions of the invention may optionally also contain from about 0.01 to about 10%, preferably from about 0.025 to about 5%, and especially from about 0.1 to about 3% by weight of various conventional stabilizer coadditives, such as the materials listed below, or mixtures thereof.

1. Antioxidants 1.1. Alkylated monophenols, for example, 2,6-di-tert-butyl-4-methylphenol
2-tert-butyl-4,6-dimethylphenol
2,6-di-tert-butyl-4-ethylphenol
2,6-di-tert-butyl-4n-butylphenol
2,6-di-tert-butyl-4i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert-butyl-4-methoxymethylphenol 1.2. Alkylated hydroguinones, for example, 2,6-di-tert-butyl-4-methoxyphenol
2,5-di-tert-butyl-hydroquinone
2,5-di-tert-amyl-hydroquinone
2,6-diphenyl-4-octadecyloxyphenol 1.3. Hydroxylated thiodiphenyl ethers, for example, 2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)

1.4. Alkylidene-bisphenols, for example, 2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl)-butane
2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane
ethyleneglycol bis-[3,3-bis-(3'-tert-butyl-4'-hydroxyphenyl)-butyrate]
di-(3-tert-butyl-4-hydroxy-5-methylphenyl)-dicyclopentadiene di-[2-(3'-tert-butyl-2'-hydroxy-5'-methyl-benzyl)-6-tert-butyl-4-methylphenyl] terephthalate.

1.5. Benzyl compounds, for example, 1,3,5-tri-(3,5-di-tert-butyl-4-hydroxybenzyl)-2,4,6-trimethylbenzene
di-(3,5-di-tert-butyl-4-hydroxybenzyl) sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl) isocyanurate
1,3,5-tris-(4-tert-butyl-3-hydroxy-2,6-dimethylbenzyl) isocyanurate
3,5-di-tert-butyl-4-hydroxybenzyl-phosphoric acid dioctadecyl ester
3,5-di-tert-butyl-4-hydroxybenzyl-phosphoric acid monoethyl ester, calcium-salt 1.6. Acylaminophenols, for example, 4-hydroxy-lauric acid anilide
4-hydroxy-stearic acid anilide
2,4-bis-octylmercapto-6-(3,5-tert-butyl-4-hydroxyanilino)-s-triazine
octyl-N-(3,5-di-tert-butyl-4-hydroxyphenyl)-carbamate 1.7. Esters of β-(3,5-di-tert-butyl-4-hydroxyphenyl)-propionic acid with monohydric or polyhydric alcohols, for example,

| methanol | diethylene glycol |
|---|---|
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.8. Esters of β-(5-tert-butyl-4-bydroxy-3-methylphenyl)-propionic acid with monohydric or polyhydric alcohols, for example,

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.9. Amides of β-(3,5-di-tert-butyl-4-hydroxyphenyl)-propionic acid for example,
N,N'-di-(3,5-di-tert-butyl-4-hydroxyphenylpropionyl)-hexarnethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine 1.10 Diarylamines, for example, diphenylamine, N-phenyl-1-naphthylamine, N-(4-tert-octylphenyl)-1-naphthylamine, 4,4'-di-tert-octyl-diphenylamine, reaction product of N-phenylbenzylamine and 2,4,4-trimethylpentene, reaction product of diphenylamine and 2,4,4-trimethylpentene, reaction product of N-phenyl-1-naphthylamine and 2,4,4-trimethylpentene.

2. UV absorbers and light stabilizers 2.1. 2-(2'-Hydroxyphenyl)-benzotriazoles, for example, the 5'-methyl-, 3',5'-di-tert-butyl-, 5'-tert-butyl-,5'-(1,1,3,3-tetramethylbutyl)-,5-chloro-3',5'-di-tert-butyl-, 5-chloro-3'-tert-butyl-5'-methyl-, 3'-sec-butyl-5'-tert-butyl-, 4'-octoxy, 3',5'-di-tert-amyl-, 3',5'-bis-(α,α-dimethylbenzyl), 3'-tert-butyl-5'-(2-(omega-hydroxy-octa-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivatives.

2.3. Esters of optionally substituted benzoic acids for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5. Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6. Sterically hindered amines, for example bis-(2,2,6,6-tetramethylpiperidyl) sebacate, bis-(1,2,2,6,6-pentamethylpiperidyl) sebacate, n-butyl-3,5-di-tert.butyl-4-hydroxybenzyl malonic acid bis-(1,2,2,6,6-pentanemethylpipelidyl)ester, condensation product of 1-hydroxyethyl-2,2,6,6-tetramethyl-4-hydroxypiperidine and succinic acid, condensation product of N,N'-(2,2,6,6-tetra-methylpiperidyl)-hexamethylenediamnine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl) 1,2,3,4-butanetetracarboxylate, 1,1' (1,2-ethanediyl)-bis-(3,3,5,5-tetramethylpiperazinone), bis (1-octyloxy-2,2,6,6tetramethylpiperidin-4yl) sebacate.

2.7. Oxalic acid diamides, for example, 4,4'-di-octyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis (3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy- as well as of o- and p-ethoxy-disubstituted oxanilides.

2.8. Hydroxyphenyl-s-tiazines, for example 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxy-ethoxy)phenyl]-6-(4-chlorophenyl)-s-triazine; 2,4-bis[2-hydroxy-4-(2-hydroxy-4-(2-ethoxy)phenyl]-6-(2,4-dimethylphenyl)-s-triazine; 2,4-bis[2-hydroxy-4-(2-hydroxyethoxy)-phenyl]-6(4-bromophenyl)-s-triazine; 2,4-bis[2-hydroxy-4-(2-acetoxyethoxy)phenyl]-6-(4-chloro-phenyl)-s-triazine, 2,4-bis(2,4-dihydroxyphenyl)-6-(2,4-dimethylphenyl)-s-triazine.

3. Metal deactivators, for example, N,N'-diphenyloxalic acid diamide, N-salicylal-N'-salicyloyl-hydrazine, N,N'-bis-salicyloylhydrazine, N,N'-bis-(3,5-di-tert-butyl-4-hydroxyphenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-isodecyl-pentaerythritol diphosphite, di-(2,4,6-tri-tert-butylphenyl)-pentaerythritol diphosphite, di-(2,4-di-tert-butyl-6-methylphenyl)-pentaerythritol diphosphite, di-(2,4-di-tert-butylphenyl)pentaerythritol diphosphite, tristearyl-sorbitol triphosphite, tetrakis-(2,4-di-tert-butylphenyl) 4,4'-diphenylylenediphosphonite.

5. Compounds which destroy peroxide, for example, esters of, β-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(β-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

7. Nitrones, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecylnitrone, N-hexadecyl-alpha-heptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, 4-tert-butyl-benzoic acid, adipic acid, diphenylacetic acid 11. Fillers and reinforcing agents, for example, calcium carbonate, silicates, glass fibers, asbestos, talc, kaolin, mica, barium sulfate, metal oxides and hydroxides, carbon black, graphite.

12. Other additives, for example, plasticizers, lubricants, emulsifiers, pigments, optical brighteners, flameproofing agents, anti-static agents, blowing agents and thiosynergists such as dilauryl thiodipropionate or distearyl thiodipropionate.

13. Benzofuranones and indolinones, for example those disclosed in U.S. Pat. No. 4,325,863, U.S. Pat No. 4,338,244 or U.S. Pat. No. 5,175,312, or 3-[4-(2-acetoxyethoxy) phenyl]-5,7-di-tert-butyl-benzo-furan-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy[]phenyl)benzofuran-2-one], 5,7-di-tert-butyl-3-(4-ethoxyphenyl)-benzofuran-2-one, 3-(4-acetoxy-3,5-dimethylphenyl)-5,7-di-tert-butyl-benzofuran-2-one, 3-(3,5-di-methyl-4-pivaloyloxyphenyl)-5,7-di-tert-butyl-benzofuran-2-one.

The co-stabilizers, with the exception of the benzofuranones listed under 13, are added for example in concentrations of 0.01 to 10%, relative to the total weight of the material to be stabilized.

Further preferred compositions comprise, in addition to components (a) and (b) further additives, in particular phenolic antioxidants, light stabilizers or processing stabilizers.

Particularly preferred additives are phenolic antioxidants (item 1 of the list), sterically hindered amines (item 2.6 of the list), phosphites and phosphonites (item 4 of the list), UV absorbers (item 2 of the list) and peroxide-destroying compounds (item 5 of the list).

Additional additives (stabilizers) which are also particularly preferred are benzofuran-2-ones, such as described, for example, in U.S. Pat No. 4,325,863, U.S. Pat No. 4,338,244 or U.S. Pat. No. 5,175,312.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinammate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxy-benzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3,-tris(2-methyl-4-hydroxy-5-tert-butylphenyl)butane, 1,3,5-tris[2-(3,5-di-tert-butyl-4-hydroxyhydrocinnamoyloxy) ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamnamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, N,N'-bis[2-(3,5-di-tert-butyl-4-hydroxyhydrocinnamoyloxy)-ethyl]-oxamide, 2,4-bis(octylthiomethyl)-6-methylphenol, and 2,4-bis(octylthiomethyl)-6-tert-butylphenol.

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-tri-methyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol, 2,2'-ethylidene-bis(4,6-di-tert-butylphenol), 2,4-bis(octylthiomethyl)-6-methylphenol or 2,4-bis(octylthiomethyl)-6-tert-butylphenol.

The hindered amine compound of particular interest is selected from the group consisting of bis(2,2,6,6tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, 4-benzoyl-2,2,6,6-tetramethylpiperidine, 4-stearyloxy-2,2,6,6-tetramethylpiperidine, 3-n-octyl-7,7,9,9-tetramethyl-1,3,8-triaza-spiro[4.5]decane-2,4-dione, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2] heneicosane, polycondensation product of 2,4-dichloro-6-tert-octylamino-s-triazine and 4,4'-hexamethylenebis (amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetramethylpiperidine) and 1,2-dibromoethane, tetrakis(2,2,6,6-tetramethylpiperidin-4-yl) 1,2,3,4-butanetetracarboxylate, tetrakis(1,2,2,6,6-pentamethylpiperidin-4-yl) 1 ,2,3,4-butanetetracarboxylate, polycondensation product of 2,4-dichloro-6-morpholino-s-triazine and 4,4'-hexamethylenebis(amino-2,2,6,6-tetramethylpiperidine), N,N',N'',N'''-tetrakis[(4,6-bis(butyl-1,2,2,6,6-pentamethyl-piperidin-4-yl)-amino-s-triazin-2-yl]-1,10-diamino-4,7-diazadecane, mixed [2,2,6,6-tetramethyl-piperidin-4-yl/β,β,β', β'-tetramethyl-3,9-(2,4,8,10-tetraoxaspiro[5.5]-undecane) diethyl] 1,2,3,4-butanetetracarboxylate, mixed [1,2,2,6,6-pentamethyl-piperidin-4-yl/β,β,β',β'-tetramethyl-3,9-(2,4,8, 10-tetraoxaspiro[5.5]-undecane)diethyl]1,2,3,4-butanetetracarboxylate, octamethylene bis(2,2,6,6-tetramethyl-piperidin-4-carboxylate), 4,4'-ethylenebis(2,2,6,6-tetramethylpiperazin-3-one), N-2,2,6,6-tetramethyl-pipendin-4-yl-n-dodecylsuccinimide, N-1,2,2,6,6-pentamethyl-piperidin-4-yl-n-dodecylsuccinimide, N-1-acetyl-2,2,6,6-tetramethylpiperidin-4-yln-dodecylsuccinimide, 1-acetyl3-dodecyl-7,7,9,9-tetramethyl-1,3,8-triazaspiro[4.5]decane-2,4-dione, di-(1-octyloxy-2,2,6,6-tetramethylpiperidin-4-yl) sebacate, di-(1-cyclohexyloxy-2,2,6,6-tetra-methylpiperidin-4-yl) succinate, 1-octyloxy-2,2,6,6-tetramethyl-4-hydroxypiperidine, poly-{[6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino], 2,4,6-tris[N-(1-cyclohexyloxy-2,2,6,6-tetramethylpiperidin-4-yl)-n-butylamino]-s-triazine, 2-(2-hydroxyethyl)amino-4,6-bis (N-(1-cyclohexyloxy-2,2,6,6-tetramethylpiperidin-4-yl)-n-butyl-amino]-s-triazine, 1,2-bis(3,3,5,5- tetramethylpiperazin-2-on-1-yl)ethane, 1,3,5-tris {N-cyclohexyl-N-[2-(3,3,5,5-tetramethylpiperazin-2-on-1-yl)ethyl]amino}-s-triazine, 1,3,5-tris {N-cyclohexyl-N-[2-(3,3,4,5,5-pentaamethylpiperazin-2-on-1-yl)ethyl]amino}-s-triazine, reaction of 2-4 equivalents of 2,4-bis[(1-cyclohexyloxy-2,2,6,6-tetramethylpiperidin-4-yl)butyl-amino]-6-chloro-s-triazine with 1 equivalent of N,N'-bis(3-aminopropyl)ethylenediamine, bis[1-(2-hydroxy-2-methylpropoxy)-2,2,6,6-tetramethylpiperidin-4-yl] sebacate, mixture of bis[1-(2-hydroxy-2-methylpropoxy)-2,2,6,6-tetrainethylpiperidin-4-yl] glutarate and bis[1-(2-hydroxy-2-methylpropoxy)-2,2,6,6-tetramethylpiperidin-4-yl] adipate, 4-hydroxy-1 -(2-hydroxy-2-methylpropoxy)-2,2,6,6-tetramethylpiperidine and 4-octadecyloxy-1-(2-hydroxy-2-methylpropoxy)-2,2,6,6-tetramethylpiperidine.

A most preferred hindered amine compound is bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, the polycondensation product of 1-(2-hydroxyethyl)-2,2,6,6-tetramethyl-4hydroxypiperidine and succinic acid, the polycondensation product of 2,4-dichloro-6-tert-octylamino-s-triazine and 4,4'-hexamethylenebis(amino-2,2,6,6-tetramethylpiperidine), N,N',N",N"'-tetrakis[(4,6-bis (butyl-(1 ,2,2,6,6-pentamethylpiperidin-4-yl)amino)-s-triazine-2-yl]-1,10-diamino-4,7-diazadecane. di-(1-octyloxy-2,2,6,6-tetramethylpiperidin-4-yl) sebacate, di-(1-cyclohexyloxy-2,2,6,6-tetramethylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6, -tetramethylpiperidin-4-yl)imino-hexamethylene-[4-(1-cyclohexyloxy-2,2,6,6-tetramethylpiperidin-4-yl)imino], 2,4,6-tris[N-(1-cyclohexyloxy-2,2,6,6-tetramethylpiperidin-4-yl)-n-butylamino]-s-triazine, 2-(2-hydroxyethyl)amino-4,6-bis[N-(1-cyclohexyloxy-2,2,6,6-tetramethylpiperidin-4-yl)-n-butylamino]-s-triazine, 1,2-bis(3,3,5,5-tetramethylpiperazin-2-on-1-yl)ethane, 1,3,5-tris {N-cyclohexyl-N-[2-(3,3,5,5-tetramethylpiperazin-2-on-1-yl)ethyl]amino}-s-triazine, 1,3,5-tris {N-cyclohexyl-N-[2-(3,3,4,5,5-pentaamethylpiperazin-2-on-1-yl)ethyl]amino}-s-triazine, reaction of 2-4 equivalents of 2,4-bis[(1-cyclohexyloxy-2,2,6,6-tetramethylpiperidin-4-yl)butyl-amino]-6-chloro-s-triazine with 1 equivalent of N,N'-bis(3-aminopropyl)ethylenediamine, bis[1-(2-hydroxy-2-methylpropoxy)-2,2,6,6-tetramethylpiperidin-4-yl] sebacate, mixture of bis[1-(2-hydroxy-2-methylpropoxy)-2,2,6,6-tetramethylpiperidin-4-yl] glutarate and bis[1-(2-hydroxy-2-methylpropoxy)-2,2,6,6-tetramethylpiperidin-4-yl] adipate, 4-hydroxy-1-(2-hydroxy-2-methylpropoxy)-2,2,6,6-tetramethylpiperidine or 4-octadecyloxy-1-(2-hydroxy-2-methylpropoxy)-2,2,6,6-tetramethylpiperidine.

The instant composition can additionally contain another UV absorber selected from the group consisting of the benzotriazoles, s-triazines, the oxanilides, the hydroxybenzophenones, benzoates and the α-cyanoacrylates.

As described above, the laminated or multilayer constructions which use an adhesive layer described above containing a highly soluble, photostable, red-shifted benzotriazole of formula I, II or III are selected from, but are not limited to, the group consisting of (a) Retroreflective Sheets and Signs and Conformable Marketing Sheets;
(b) Solar Control Films of Various Construction;
(c) Corrosion Resistant Silver Mirrors and Solar Reflectors;
(d) Reflective Print Labels;
(e) UV Absorbing Glasses and Glass Coatings;
(f) Electrochromic Devices;
(g) Films/Glazings;
(h) Windscreens and Intermediate Layers; and
(i) Optical Films.

Preferably, the laminated or multilayer constructions which use an adhesive layer containing a benzotriazole of formula I, II or III is selected from the group consisting of (a) Retroreflective Sheets and Signs and Conformable Marketing Sheets;
(b) Solar Control Films of Various Construction;
(e) UV Absorbing Glasses and Glass Coatings;
(g) Films/Glazings; and
(h) Windscreens and Intermediate Layers.

Most especially the laminated or multilayer constructions are (b) Solar Control Films of Various Construction; or
(h) Windscreens and Intermediate Layers.

The adhesive of component (a) which can be used in a laminated or multilayer article is selected from, but not limited to, the group consisting of (i) Pressure Sensitive Adhesives;
(ii) Rubber-Based Adhesives;
(iii) Solvent and/or Emulsion Based Adhesives;
(iv) Hot Melt Adhesives; and
(v) Natural Product Based Adhesives.

The adhesives are selected from the following chemical groups (i) Polyurethanes;
(ii) Polyacrylics;
(iii) Epoxys;
(iv) Phenolics;
(v) Polyimides;
(vi) Poly(vinyl butyral);
(vii) Polycyanoacrylates;
(viii) Polyacrylates;
(ix) Ethylene/acrylic acid copolymers and their salts (ionomers);
(x) Silicon polymers;
(xi) Poly(ethylenelvinyl acetate);
(xii) Atatic polypropylene;
(xiii) Styrene-diene copolymers;
(xiv) Polyamides;
(xv) Hydroxyl-terminated polybutadiene;
(xvi) Polychloroprene;
(xvii) Poly(vinyl acetate);
(xviii) Carboxylated styrene/butadiene copolymers;
(xix) Poly(vinyl alcohol); and
(xx) Polyesters.

The following optional components are often also present in adhesive formulations and are presented here for illustrative purposes only and are not meant to limit the total adhesive compositions in any way. These optional components include plasticizers, adhesion promoters, waxes, petroleum waxes, elastomers, tackifier resins, oils, resins, polymers, rosin, modified rosin or rosin derivatives, hydrocarbon resins, terpene resins, paraffm wax, microcrystalline wax, synthetic hard wax and/or polyethylene wax. The amounts of these coadditives are those normally used in adhesive formulations.

Although in the instant invention, the instant benzotriazoles are intended for use in the adhesive and the adhesive layers of the laminated or multilayer articles, it is clear that the same beneficial UV absorption protection would be afforded to the articles if said benzotriazoles are also incorporated into the other layers of the articles, e.g. polymeric films with any dye or pigment present therein, whether by direct incorporation, by coextrusion or by migration from the adhesive layer into said other layer(s).

These polymers are those selected from the group consisting of (1) polyolefins;

(2) mixtures of polyolefins;

(3) copolymers of monoolefins and diolefins or other vinyl monomers;

(4) polystyrene, poly(p-methylstyrene) or poly(α-methylstyrene);

(5) copolymers of styrene or α-methylstyrene with dienes or acrylic derivative;

(6) graft copolymers of styrene or α-methylstyrene;

(7) halogen containing polymers;

(8) polymers derived from α,β-unsaturated acids and derivatives thereof;

(9) copolymers of monomers of (8) with each other or other unsaturated monomers;

(10) polymers derived from unsaturated alcohols and amines or the acyl derivatives or acetals thereof;

(11) polyacetals such as polyoxymethylene and those polyoxymethylenes which contain ethylene oxide as a comonomer, polyacetals modified with thermoplastic polyurethanes, acrylates or MBS;

(12) polyurethanes;

(13) polyamides and copolyamides from diamines and dicarboxylic acids and/or from aminocarboxylic acids or the corresponding lactams;

(14) polyureas or polyimides;

(15) polyesters derived from dicarboxylic acids and diols and/or from hydroxycarboxylic acids or the corresponding lactones, especially poly(ethylene terephthalate) (PET) and poly(ethylene 2,6-naphthalenedicarboxylate) (PEN);

(16) polycarbonates and polyester carbonates;

(17) polysulfones and polyether sulfones;

(18) crosslinked polymers derived from aldehydes on the one hand and phenols, ureas and melamines on the other hand;

(19) unsaturated polyester resins derived from copolyesters of saturated and unsaturated dicarboxylic acids with polyhydric alcohols and vinyl compounds as crosslinking agents;

(20) crosslinkable acrylic resins derived from substituted acrylates;

(21) blends of the aforementioned polymers;

(22) polysiloxanes;

(23) polyketimines in combination with unsaturated acrylic polyacetoacetate resins or with unsaturated acrylic resins;

(24) radiation curable compositions containing etbylenically unsaturated monomers or oligomers and a polyunsaturated aliphatic oligomer; and

(25) ionomers (copolymers of ethylene/acrylic acid and their salts).

Additionally, the instant adhesives particularly when the adhesive is poly(vinyl butyral) may be inserted between two (or more) layers of glass such as in an automobile windshield.

Preferably the adhesive component (a) is a resin selected from the group consisting of poly(vinyl butyral), ethylene/vinyl acetate copolymers, polyacrylics, polyacrylates, natural rubber, polycyanoacrylates, poly(vinyl alcohol), styrene/butadiene rubber, phenolics, urea-formaldehyde polymers, epoxy resins, vinyl polymers, polyamides, polyurethanes, polyesters and styrene block copolymers.

Most especially, the adhesive of component (a) is a resin selected from the group consisting of poly(vinyl butyral), ethylene/vinyl acetate copolymers, polyacrylics, polyacrylates, natural rubber, polycyanoacrylates, poly(vinyl alcohol), styrenelbutadiene rubber, phenolics, vinyl polymers, polyurethanes and styrene block copolymers.

The especially preferred adhesive component are the polyacrylates.

The following examples are for illustrative purposes only and are not to be construed to limit the instant invention in any manner whatsoever.

EXAMPLE 1

UV Absorption Spectra

The instant benzotriazoles having different electron withdrawing groups in the 5-position of the benzo ring of the benzotriazole and with the remaining portion of the molecule being the same (substituted on the phenyl ring with a 3-α-cumyl moiety and a 5-tert-octyl group) are clearly red-shifted as seen by the wavelength at their maximum absorbance value. The UV spectra are measured in ethyl acetate solution at ca. 20 mg/L concentration.

| Compound* | λmax (nm) | absorbance at 375 (nm) |
|---|---|---|
| A | 345 | 0.28 |
| B | 348 | 0.33 |
| C | 362 | 0.50 |
| D | 358 | 0.42 |

*A is 2-(2-hydroxy-3-α-cumyl-5-tert-octylphenyl)-2H-benzotriazole.
B is 5-trifluoromethyl-2-(2-hydroxy-3-α-cumyl-5-tert-octylphenyl)-2H-benzotriazole.
C is 5-phenylsulfonyl-2-(2-hydroxy-3-α-cumyl-5-tert-octylphenyl)-2H-benzotriazole.
D is 5-methoxycarbonyl-2-(2-hydroxy-3-α-cumyl-5-tert-octylphenyl)-2H-benzotriazole.

EXAMPLE 2

UV Absorption Spectra

The instant benzotriazoles having different electron withdrawing groups in the 5-position of the benzo ring of the benzotriazole and with the different substitutions on the phenyl ring at the 3- and 5-positions. The UV absorption spectra are measured in ethyl acetate at approximately 20 mg/L concentration. The instant compounds are clearly red-shifted as compared to the compound having only a hydrogen at the 5-position of the hbenzo ring.

| Compound* | λmax (nm) | absorbance at 375 (nm) |
|---|---|---|
| A | 345 | 0.28 |
| E | 357 | 0.59 |
| F | 354 | 0.41 |

*A is 2-(2-hydroxy-3-α-cumyl-5-tert-octylphenyl)-2H-benzotriazole.
E is 5-butylsulfonyl-2-(2-hydroxy-3,5-di-tert-butylphenyl)-2H-benzotriazole.
F is methyl 3-(5-trifluoromethyl-2H-benzotriazol-2-yl)-5-tert-butyl-4-hydroxyhydrocinnamate.

EXAMPLE 3

Benzotriazole Solubility in Adhesive

To measure this solubility a number of structurally different benzotriazoles are added to a typical adhesive GELVA® 263 (Solutia) which is a 44.5% solution of a polyacrylate in a mixture of ethyl acetate and hexane. The polyacrylate is a copolymer of methyl methacrylate, 2-ethylhexyl methacrylate and glycidyl methacrylate.

The test benzotriazole is dissolved in 5 mL of ethyl acetate, toluene or a mixture of ethyl acetate and toluene. To the solution is added 5 g of GELVA® 263 and 2–3 mL of the resulting solution is placed into individual watch glasses. Solubility is then evaluated based upon observed crystallization once the solvent has evaporated. Observations start after several hours and then continue over a period of several weeks.

The solubility values given in the table below are approximate maximum concentrations where no sign of subsequent crystallization is evident. Solubilities are reported in weight of total benzotriazole added to GELVA® 263 as is. From these data it clear that the instant benzotriazoles are considerably more soluble in adhesives (in this case GELVA® 263) than many benzotriazoles of the prior art. The use of many benzotriazoles in adhesives has been limited in the past by the limited solubility and compatibility of some benzotriazole compounds. By using the instant benzotriazoles, the use levels can be increased substantially to add greatly increased stabilization protection which is further augmented by the photostability and the red-shiftedness of the instant benzotriazoles.

| Compound* | Trade Name or Class | Solubility without Crystallization (%) |
|---|---|---|
| A | 5-ethylsulfonyl | <1 |
| B | TINUVIN ® 900 | 2.0 |
| C | TINUVIN ® 327 | 2.0 |
| D | 5-butylsulfonyl | 4.0 |
| E | 5-CF$_3$ | 4.0 |
| F | 5,5'-CF$_3$ | 4.0 |
| G | 5-butylsulfonyl | 8.0 |
| H | 5-CF$_3$ | 8.0 |
| I | 5-CF$_3$ | 8.0 |
| J | 5-methoxycarbonyl-methylsulfinyl | 8.0 |
| K | 5-phenylsulfonyl | 11.3 |
| L | 5-phenylsulfonyl | 11.3 |
| M | 5-CF$_3$ | 22.6 |
| N | 5-CF$_3$ | 22.6 |
| O | 5-CF$_3$ | 22.6 |

*A is 5-ethylsulfonyl-2-(2-hydroxy-5-methylphenyl)-2H-benzotriazole.
B is 2-(2-hydroxy-3,5-di-α-cumylphenyl)-2H-benzotriazole.
C is 5-chloro-2-(2-hydroxy-3,5-di-tert-butylphenyl)-2H-benzotriazole.
D is 5-butylsulfonyl-2-(2-hydroxy-3,5-di-tert-butylphenyl)-2H-benzotrizole.
E is 5-trifluoromethyl-2-(2-hydroxy-3,5-di-α-cumylphenyl)-2H-benzotriazole.
F is 2,2'-methylene-bis[6-(5-trifluoromethyl-2H-benzotriazol-2-yl)-4-tert-octylphenol].
G is 5-butylsulfonyl-2-(2-hydroxy-3-α-cumyl-5-tert-octylphenyl)-2H-benzotriazole;
H is 5-trifluoromethyl-2-(2-hydroxy-5-tert-octylphenyl)-2H-benzotriazole;
I is methyl 3-(5-trifluoromethyl-2H-benzotriazol-2-yl)-5-tert-butyl-4-hydroxyhydrocinnamate.
J is 5-methoxycarbonylmethylsulfinyl-2-(2-hydroxy-3,5-di-tert-butylphenyl)-2H-benzotriazole.
K is methyl 3-(5-phenylsulfonyl-2H-benzotriazol-2-yl)-5-tert-butyl-4-hydroxyhydrocinnamate.
L is 5-phenylsulfonyl-2-(2-hydroxy-3,5-di-tert-butylphenyl)-2H-benzotriazole.
M is 5-trifluoromethyl-2-(2-hydroxy-3-α-cumyl-5-tert-octylphenyl)-2H-benzotriazole.
N is 5-trifluoromethyl-2-(2-hydroxy-3,5-di-tert-octylphenyl)-2H-benzotriazole.
O is 5-trifluoromethyl-2-(2-hydroxy-3-α-cumyl-5-tert-butylphenyl)-2H-benzotriazole.

EXAMPLE 4

Weathering Experiments

To ascertain the effect of durability and loss rate of benzotriazoles, the following tests are carried out on adhesive compositions in selected articles.

GELVA® 263 (Solutia) adhesive is described in Example 3. A biaxially oriented poly(ethylene terephthalate) (PET) film is obtained from United States Plastics.

The GELVA® 263 is reduced 50% by dilution with ethyl acetate to a final resin solids content of 23%. The test stabilizer is dissolved in the GELVA® 263 solution and samples are prepared in duplicate. The formulations seen in the table below are based on total coating solids. Approximately 8 micron coatings are applied to 1.5 inch glass discs for each formulation using a Headway Research Inc. Photo Resist Spinner (Model EC101DT) operating at 5000 rpm for 10 seconds. All formulations receive the same 80° C.×3 minute bake in a Hereaus model LUT 6050F oven operating at 3 air changes/minute.

Since the adhesive remains tacky even after baking a direct thickness measurement is not possible. Indirect film thickness is determined by creating an adhesive sandwich between to layers of PET film and comparing its thickness versus two PET sheets without adhesive using magnetic induction methodology.

The spin coating conditions are thus obtained. Further, since the spin coating conditions are not changed for applying the adhesive onto the glass, very little if any thickness variations are expected. After curing it in an oven, a layer of PET (ca 2 mils) is placed over the adhesive and pressed down.

Absorbance spectra are collected using a Perkin Elmer Lambda 19 Spectrophotometer running UVWINLAB software. Absorbance data are collected from 400–300 nm every half nanometer at a speed of 240 nm/minute and a slit width of 2 nm.

Weathering is done at a controlled irradiance at 6500 W. The cycle is as follows: 3.8 hours straight irradiance with no water spray, followed by one hour darkness. In the light cycle, the black panel temperature is controlled at 89° C. The chamber (dry bulb) temperature is 62° C. in the light cycle. The relative humidity in the light cycle is in the range of 50–55% and in the dark cycle 95%. The chamber (dry bulb) temperature is 38° C. in the dark cycle.

The test samples are placed in a Xenon Arc Weather-O-meter with the glass facing the Xenon lamp to emulate articles such as solar films. UV spectra are obtained at about 250 hour intervals. UV spectra are obtained at 500 hours and the samples are rotated to insure that all samples receive similar weathering conditions.

To follow the loss of UV absorbers from the adhesive composition, UV spectra measured initially and after weathering. The UV spectrophotometer measure absorbance linearly up to 5.5 absorbance units using a reference beam attenuation technique.

It is assumed that the degradation products for the UV absorber do not contribute to the UV spectrum. This is tested by following the ratio of absorbance of the band at 300 nm and the band at about 340 nm. The ratio does not change upon weathering the sample. This suggests that the UV spectrum of the weathered films correspond to the amount of UV absorber remaining in the film with very little if any contribution to the spectrum by the photodegradants.

The results after 893 hours exposure are given in the table below.

| Compound (%)* | Initial Absorbance | Final Absorbance | Absorbance Loss |
|---|---|---|---|
| I (8%) | 2.998 | 2.048 | 0.950 |
| II (10%) | 2.810 | 2.013 | 0.797 |
| III (10%) | 2.181 | 1.904 | 0.277 |
| III (10%) + IV (0.5%) | 2.088 | 1.974 | 0.114 |

*% is the weight amount in formulation.
I is 2,2'-dihydroxy-4-methoxybenzophenone.
II is octyl 3-(2H-benzotriazol-2-yl)-5-tert-butyl-4-hydroxyhydrocinnamate.
III is 5-trifluoromethyl-2-(2-hydroxy-3-α-cumyl-5-tert-octylphenyl)-2H-benzotriazole.
IV is bis(1-octyloxy-2,2,6,6-tetramethylpiperidin-4-yl) sebacate.

These data clearly show that the instant benzotriazoles substituted at the 5-position of the benzo ring with an electron withdrawing moiety are especially durable in adhesives as measured by the low loss rate of absorbance values after exposure to actinic radiation. Additionally, it is seen that the red-shifted benzotriazoles are far superior to the benzophenones in adhesive compositions. Furthermore, the combination of the red-shifted benzotriazoles with a hindered amine stabilizer offers quite superior performance. In summary, the instant red-shifted benzotriazoles combine both great photostability and unexpectedly high solubility in adhesive systems.

EXAMPLE 5

Weathering Experiments

In an experiment similar to Example 4, GELVA® 263 (Solutia) adhesive described in Example 3, which contains 8% by weight of a test compound, is placed between a sheet of glass and a biaxially oriented film of poly(ethylene terephthalate) (PET) described in Example 4. The structure is then exposed to weathering for 947 hours as described in Example 4.

The results are seen in the table below. Each test sample also contains 0.5% of the hindered amine bis(1-octyloxy-2,2,6,6-tetramethylpiperidin-4-yl) sebacate.

| Compound (%)* | Initial Absorbance | Final Absorbance | Absorbance Loss |
|---|---|---|---|
| I (8%) | 2.88 | 2.12 | 0.76 |
| II (8%) | 1.73 | 1.55 | 0.18 |
| III (8%) | 1.46 | 1.45 | 0.01 |

*% is the weight amount in formulation.
I is 2,2'-dihydroxy-4-methoxybenzophenone.
II is methyl 3-(5-trifluoromethyl-2H-benzotriazol-2-yl)-5-tert-butyl-4-hydroxyhydrocinnamate.
III is 5-trifluoromethyl-2-(2-hydroxy-3-α-cumyl-5-tert-octylphenyl)-2H-benzotriazole.

These data clearly show that the instant benzotriazoles substituted at the 5-position of the benzo ring with an electron withdrawing moiety are especially durable in adhesives as measured by the low loss rate of absorbance values after exposure to actinic radiation. Additionally, it is seen that the red-shifted benzotriazoles are far superior to the benzophenones in adhesive compositions. Furthermore, the combination of the red-shifted benzotriazoles with a hindered amine stabilizer offers quite superior performance. In summary, the instant red-shifted benzotriazoles combine both great photostability and unexpectedly high solubility in adhesive systems.

EXAMPLE 6

Windshield Interlayer Assembly

When an adhesive composition containing a benzotriazole UV absorber is placed between two sheets of glass, the assembly resembles a typical windshield. In this confined environment, there is no chance that the benzotriazole stabilizer can escape by volatility since the glass sheets provide a impervious container for the adhesive interlayer. The photostability and durability of the soluble benzotriazole stabilizer is now paramount. Benzotriazole UV absorbers whose structures causes them to be volatile and which precludes their use in other types of applications can be used in such windshield interlayer assemblies with impunity to achieve long lasting and stable windshield structures.

A windshield or windscreen prototype structure is exposed to weathering according to the procedure described in Example 4. The GELVA® 263 (Solutia) adhesive is placed between two sheets of glass and additionally contains 8% by weight of selected test UV absorbers. The structure is then exposed to weathering for 1338 hours as described in Example 4.

The results are seen in the table below. Each test sample contains only a UV absorber and no hindered amine coadditive.

| Compound (%)* | Initial Absorbance | Final Absorbance | Absorbance Loss |
|---|---|---|---|
| I (8%) | 2.69 | 0.85 | 1.84 |
| II (8%) | 2.24 | 1.54 | 0.70 |
| III (8%) | 1.81 | 1.02 | 0.79 |

*% is the weight amount in formulation.
I is 2,2'-dihydroxy-4-methoxybenzophenone.
II is 5-trifluoromethyl-2-(2-hydroxy-5-tert-octylphenyl)-2H-benzotriazole.
III is methyl 3-(5-trifluoromethyl-2H-benzotriazol-2-yl)-5-tert-butyl-4-hydroxyhydrocinnamate.

These data clearly show that the instant benzotriazoles substituted at the 5-position of the benzo ring with an electron withdrawing moiety are especially durable in adhesives as measured by the low loss rate of absorbance values after exposure to actinic radiation. Additionally, it is seen that the red-shifted benzotriazoles are far superior to the benzophenones in adhesive compositions. In summary, the instant red-shifted benzotriazoles combine both great photostability and unexpectedly high solubility in adhesive systems.

EXAMPLE 7

A windshield or windscreen prototype structure as described in Example 6 is exposed to weathering according to the procedure described in Example 4. The GELVA® 263 (Solutia) adhesive is placed between two sheets of glass and additionally contains 8% by weight of selected test UV absorbers. The structure is then exposed to weathering for 1338 hours as described in Example 4.

The results are seen in the table below. Each test sample also contains 0.5% of the hindered amine bis(1-octyloxy-2,2,6,6-tetramethylpiperidin-4yl) sebacate.

| Compound (%)* | Initial Absorbance | Final Absorbance | Absorbance Loss |
|---|---|---|---|
| I (8%) | 3.69 | 2.89 | 0.80 |
| II (8%) | 2.06 | 1.85 | 0.21 |
| III (8%) | 1.45 | 1.21 | 0.24 |
| IV (8%) | 1.84 | 1.61 | 0.23 |
| V (8%) | 1.34 | 1.02 | 0.32 |

*% is the weight amount in formulation.
I is 2,2'-dihydroxy-4-methoxybenzophenone.
II is 5-trifluoromethyl-2-(2-hydroxy-5-tert-octylphenyl)-2H-benzotriazole.
III is 5-trifluoromethyl-2-(2-hydroxy-3-α-cumyl-5-tert-octylphenyl)-2H-benzotriazole.
IV is methyl 3-(5-trifluoromethyl-2H-benzotriazol-2-yl)-5-tert-butyl-4-hydroxyhydrocinnamate.
V is 5-n-butylsulfonyl-2-(2-hydroxy-3-α-cumyl-5-tert-octylphenyl)-2H-benzotriazole.

These data clearly show that the instant benzotriazoles substituted at the 5-position of the benzo ring with an electron withdrawing moiety are especially durable in adhesives as measured by the low loss rate of absorbance values after exposure to actinic radiation. Additionally, it is seen that the red-shifted benzotriazoles are far superior to the benzophenones in adhesive compositions. Furthermore, the combination of the red-shifted benzotriazoles with a hindered amine stabilizer offers quite superior performance. In summary, the instant red-shifted benzotriazoles combine both great photostability and unexpectedly high solubility in adhesive systems.

EXAMPLE 8

The instant benzotriazole UV absorbers can be used in film and rigid plastic protective overlaminates for printed matter and photographs providing excellent photostability.

EXAMPLE 9

The instant benzotriazole UV absorbers can be used in backlit displays to provide excellent long term stabilization.

EXAMPLE 10

The instant benzotriazole UV absorbers can be used in semi-transparent and opaque window displays, signs and decals wherein a film or rigid plastic graphic is laminated to window glass to provide excellent long term stabilization.

EXAMPLE 11

The instant benzotriazole UV absorbers can be used in clear/tinted anti-graffiti films used over class, metal or plastic substrates to provide excellent long term stabilization.

EXAMPLE 12

The instant benzotriazoleUV absorbers can be used in clear anti-lacerative or "security" films used over or between layers of glass or polycarbonate to provide long term stabilization.

EXAMPLE 13

The instant benzotriazole UV absorbers can be used in decorative and protective films and dec als for painted surfaces such as on automobiles, buses, equipment and other exterior products to provide long term stabilization.

What is claimed is:

1. A stabilized adhesive composition, suitable for use as an adhesive layer in a laminated article or multilayer construction, which comprises
   (a) an adhesive resin selected from the group consisting of the
      (i) polyurethanes;
      (ii) polyacrylics;
      (vi) poly(vinyl butyral);
      (viii) polyacrylates;
      (xi) poly(ethylenelvinyl acetate);
      (xvii) polytvinyl acetate); and
      (xx) polyesters; and
   (b) an effective stabilizing amount of a benzotriazole of formula I, II or III

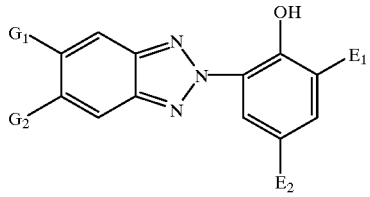

(I)

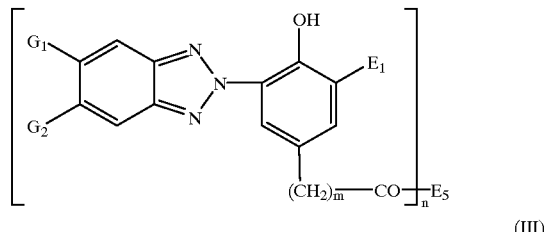

(II)

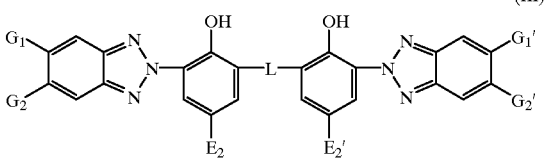

(III)

wherein
   $G_1$ and $G_1'$ are independently hydrogen or halogen, $G_2$ and $G_2'$ are independently perfluoroalkyl of 1 to 12 carbon atoms; or $G_2'$ is also hydrogen,
   $E_1$ is hydrogen, straight or branched chain alkyl of 1 to 24 carbon atoms, straight or branched chain alkenyl of 2 to 24 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or $E_1$ is alkyl of 1 to 24 carbon atoms substituted by one or two hydroxy groups,
   $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms; or $E_2$ and $E_2'$ are independently said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where $E_4$ is straight or branched chain alkyl of 1 to 24 carbon atoms; or said alkyl or said alkenyl interrupted by one or more —O—, —NH— or —NE$_4$— groups or mixtures thereof and which can be unsubstituted or substituted by one or more —OH, —OE$_4$ or —NH$_2$ groups or mixtures thereof;

n is 1 or 2, when n is 1, $E_5$ is OE$_6$ or NE$_7$E$_8$, or $E_5$ is —PO(OE$_{12}$)$_2$, —OSi(E$_{11}$)$_3$ or —OCO—E$_{11}$, or straight or branched chain $C_1$–$C_{24}$alkyl which is interrupted by —O—, —S— or —NE$_{11}$, and which can be unsubstituted or substituted by —OH or —OCO—E$_{11}$, $C_5$–$C_{12}$ cycloalkyl which is unsubstituted or substituted by —OH, straight chain or branched $C_2$–$C_{18}$alkenyl which is unsubstituted or substituted by —OH, $C_7$–$C_{15}$aralkyl, —CH$_2$—CHOH—E$_{13}$ or glycidyl, $E_6$ is hydrogen, straight or branched chain $C_1$–$C_{24}$alkyl which is unsubstituted or substituted by one or more OH, OE$_4$ or NH$_2$ groups, or —OE$_6$ is —(OCH$_2$CH$_2$)$_w$OH or —(OCH$_2$CH$_2$)$_w$OE$_{21}$ where w is 1 to 12 and $E_{21}$ is alkyl of 1 to 12 carbon atoms, $E_7$ and $E_8$ are independently hydrogen, alkyl of 1 to 18 carbon atoms, straight or branched chain $C_3$–$C_{18}$alkyl which is interrupted by —O—, —S— or —NE$_{11}$—, $C_5$–$C_{12}$cycloalkyl, $C_6$–$C_{14}$aryl or $C_1$–$C_3$hydroxylalkyl, or $E_7$ and $E_8$ together with the N atom are a pyrrolidine, piperidine, piperazine or morpholine ring, $E_5$ is —X—(Z)P—Y—E$_{15}$ wherein X is —O— or —N(E$_{16}$)—, Y is —O— or —N(E$_{17}$)—, Z is $C_2$–$C_{12}$-alkylene, $C_4$–$C_{12}$-alkylene interrupted by one to three nitrogen atoms, oxygen atoms or a mixture thereof, or is $C_3$–$C_{12}$-alkylene, butenylene, butynylene, cyclohexylene or phenylene, each substituted by a hydroxyl group, m is zero, 1 or 2, p is 1, or p is also zero when X and Y are —N(E$_{16}$)— and —N(E$_{17}$)—, respectively, $E_{15}$ is a group —CO—C(E$_{18}$)=C(H)E$_{19}$ or, when Y is —N(E$_{17}$)—, forms together with E$_{17}$ a group —CO—CH=CH—CO—, wherein E$_{18}$ is hydrogen or methyl, and E$_{19}$ is hydrogen, methyl or —CO—X—E$_{20}$, wherein E$_{20}$ is hydrogen, $C_1$–$C_{12}$-alkyl or a group of the formula

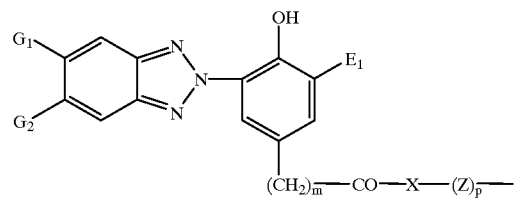

wherein the symbols $E_1$, $G_2$, X, Z, m and p have the meanings defined above, and $E_{16}$ and $E_{17}$ independently of one another are hydrogen, $C_1$–$C_{12}$-alkyl, $C_3$–$C_{12}$-alkyl interrupted by 1 to 3 oxygen atoms, or is cyclohexyl or $C_7$–$C_{15}$aralkyl, and $E_{16}$ together with $E_{17}$ in the case where Z is ethylene, also forms ethylene, when n is 2, $E_5$ is one of divalent radicals —O—E$_9$—O— or —N(E$_{11}$)—E$_{10}$—N(E$_{11}$)—, $E_9$ is $C_2$–$C_8$alkylene, $C_4$–$C_8$alkenylene, $C_4$alkynylene, cyclohexylene, straight or branched chain $C_4$–$C_{10}$alkylene which is interrupted by —O— or by —CH$_2$—CHOH—CH$_2$—O—E$_{14}$—O—CH$_2$—CHOH—CH$_2$—, $E_{10}$ being straight or branched chain $C_2$–$C_{12}$alkylene which may be interrupted by —O—, cyclohexylene, or

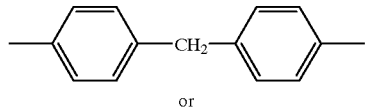

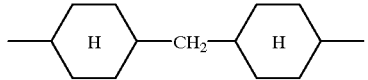

or $E_{10}$ and $E_{11}$ with the two nitrogen atoms form a piperazine ring, $E_{14}$ is straight or branched chain $C_2$–$C_8$alkylene, straight or branched chain $C_4$–$C_{10}$alkylene which is interrupted by —O—, cycloalkylene, arylene or

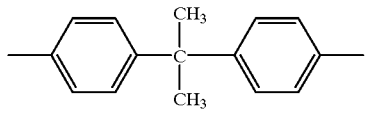

or

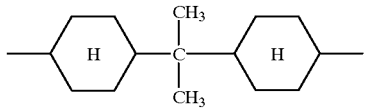

where $E_7$ and $E_8$ are independently hydrogen, alkyl of 1 to 18 carbon atoms or $E_7$ and $E_8$ together are alkylene of 4 to 6 carbon atoms, 3-oxapentamethylene, 3-iminopentamethylene or 3-methyliminopentamethylene, $E_{11}$ is hydrogen, straight or branched chain $C_1$–$C_{18}$alkyl, $C_5$–$C_{12}$cycloalkyl, straight or branched chain $C_2$–$C_{18}$alkenyl, $C_6$–$C_{14}$aryl or $C_7$–$C_{15}$aralkyl, $E_{12}$ is straight or branched chain $C_1$–$C_{18}$alkyl, straight or branched chain $C_3$–$C_{18}$alkenyl, $C_5$–$C_{10}$cycloalkyl, $C_6$–$C_{16}$aryl or $C_7$–$C_{15}$aralkyl, $E_{13}$ is H, straight chain or branched $C_1$–$C_{18}$alkyl which is substituted by —PO(OE$_{12}$)$_2$, phenyl which is unsubstituted or substituted by OH, $C_7$–$C_{15}$aralkyl —r -CH$_2$OE$_{12}$, and L is alkylene of 1 to 12 carbon atoms, alkylidene of 2 to 12 carbon atoms, benzylidene, p-xylylene, α,α,α',α'-tetramethyl-m-xylylene or cycloalkylidene.

2. A composition according to claim 1 wherein the adhesive of component (a) is poly(vinyl butyral).

3. A composition according to claim 1 wherein the benzotriazole compound of formula I is

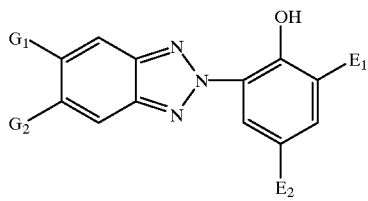

(I)

wherein $G_1$ is hydrogen, $G_2$ is CF$_3$—, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylallyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE4 or —N(E$_4$)$_2$, or mixtures thereof, where $E_4$ is straight or branched chain alkyl of 1 to 24 carbon atoms; or said alkyl or said alkenyl interrupted by one or more —O—, —NH— or —NE$_4$—groups or mixtures thereof and which can be unsubstituted or substituted by one or more —OH, —OE$_4$ or —NH$_2$ groups or mixtures thereof;

is a compound of formula I wherein, $G_1$ is hydrogen, $G_2$ is CF$_3$—, $E_1$ is hydrogen or straight or branched alkyl of 1 to 24 carbon atoms, $E_2$ is as defined above.

4. A composition according to claim 1 wherein the benzotriazole compound is a compound of formula IIA

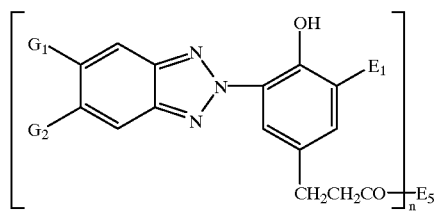

(IIA)

wherein $G_1$ is hydrogen, $G_2$ is is CF$_3$—

$E_1$ is hydrogen, straight or branched alkyl of 1 to 24 carbon atoms or phenylalkyl of 7 to 15 carbon atoms, $E_5$ is —OE$_6$ or —NE$_7$E$_8$, or $E_5$ is —X—(Z)$_p$—Y—E$_{15}$ wherein X is —O— or —N(E$_{16}$)—, Y is —O— or —N(E$_{17}$)—, Z is $C_2$–$C_{12}$-alkylene, $C_4$–$C_{12}$-alkylene interrupted by one to three nitrogen atoms, oxygen atoms or a mixture thereof, or is $C_3$–$C_{12}$alkylene, butenylene, butynylene, cyclohexylene or phenylene, each substituted by a hydroxyl group, m is 0, 1, 2 or 3, p is 1, or p is also zero when X and Y are —N(E$_{16}$)— and —N(E$_{17}$)—, respectively, $E_{15}$ is a group —CO—C(E$_{18}$)=C(H)E$_{19}$ or, when Y is —N(E$_{17}$)—, forms together with E$_{17}$ a group —CO—CH=CH—CO—, wherein E$_{18}$ is hydrogen or methyl, and E$_{19}$ is hydrogen, methyl or —CO—X—E$_{20}$, wherein E$_{20}$ is hydrogen, $C_1$–$C_{12}$-alkyl or a group of the formula.

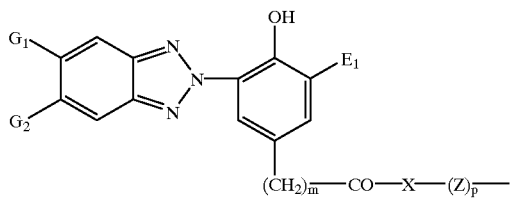

5. A composition according to claim 1 wherein the benzotriazole is a compound of formula IIIA

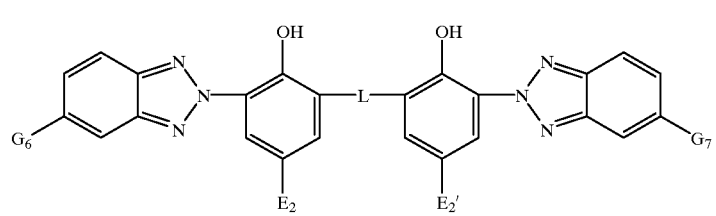

(IIIA)

wherein
- $G_6$ is $CF_3$,
- $G_7$ is hydrogen or $CF_3$,
- $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and
- L is alkylene of 1 to 12 carbon atoms, alkylidene of 2 to 12 carbon atoms, benzylidene, p-xylylene, α,α,α',α'-tetramethyl-m-xylylene or cycloalkylidene.

6. A composition according to claim 1 wherein the benzotriazole is a compound of formula I

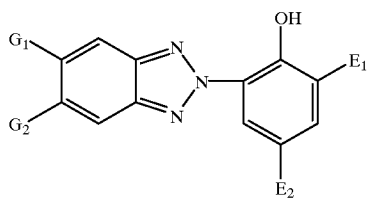

(I)

wherein
- $G_1$ is hydrogen,
- $G_2$ is $CF_3$—,
- $E_1$ is phenylalkyl of 7 to 15 carbon atoms, phenyl, or said phenyl or said phenylalkyl substituted on the phenyl ring by 1 to 4 alkyl of 1 to 4 carbon atoms,
- $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said aLkyl of 1 to 24 carbon atoms or said alkenyl of 2 to 18 carbon atoms substituted by one or more —OH, —OCOE$_{11}$, —NH$_2$ or —NHCOE$_{11}$, or mixtures thereof, or said alkyl or said alkenyl interrupted by one or more —O— and which can be unsubstituted or substituted by one or more —OH, or is a compound of formula I wherein,
- $G_1$ is hydrogen,
- $G_2$ is $CF_3$—,
- $E_1$ is hydrogen, straight or branched alkyl of 1 to 24 carbon atoms or phenylalkyl of 7 to 15 carbon atoms, and
- $E_2$ is as defined above.

7. A composition according to claim 1 wherein the benzotriazole is a compound of formula IIA

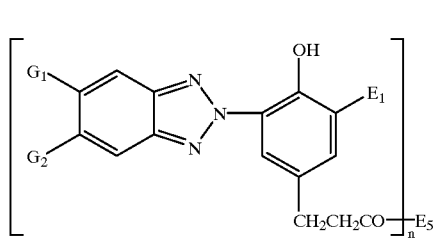

(IIA)

wherein
- $G_1$ is hydrogen,
- $G_2$ is $CF_3$—,
- $E_1$ is hydrogen, straight or branched alkyl of 1 to 24 carbon atoms or phenylalkyl of 7 to 15 carbon atoms,
- $E_5$ is —OE$_6$ or —NE$_7$E$_8$ where
- $E_6$ is hydrogen, straight or branched chain $C_1$–$C_{24}$alkyl which is unsubstituted or substituted by one or more OH groups, or —OE$_6$ is —(OCH$_2$CH$_2$)$_w$OH or —(OCH$_2$CH$_2$)$_w$OE$_{21}$ where w is 1 to 12 and $E_{21}$ is alkyl of 1 to 12 carbon atoms, and
- $E_7$ and $E_8$ are independently hydrogen, alkyl of 1 to 18 carbon atoms, straight or branched chain $C_3$–$C_{18}$alkyl which is interrupted by —O—, —S— or —NE$_{11}$—, $C_5$–$C_{12}$cycloalkyl, $C_6$–$C_{14}$aryl or $C_1$–$C_3$hydroxylalkyl, or $E_7$ and $E_8$ together with the N atom are a pyrrolidine, piperidine, piperazine or morpholine ring.

8. A composition according to claim 1 wherein the benzotriazole is a compound of formula IIIA

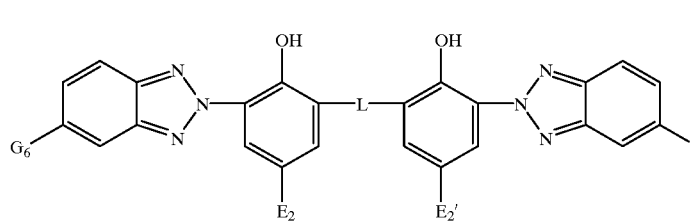

(IIIA)

wherein
- $G_6$ is $CF_3$,
- $G_7$ is hydrogen or $CF_3$,
- $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and L is methylene.

9. A composition according to claim 1 wherein the benzotriazole is
   (a) 5-trifluoromethyl-2-(2-hydroxy-3-α-cumyl-5-tert-octylphenyl)-2H-benzo-triazole;
   (b) 5-trifluoromethyl-2-(2-hydroxy-5-tert-octylphenyl)-2H-benzotriazole;
   (c) 5-trifluoromethyl-2-(2-bydroxy-3,5-di-tert-octylphenyl)-2H-benzotriazole;
   (d) 2,2'-methylene-bis[6-(5-trifluoromethyl-2H-benzotriazol-2-yl)-4-tert-octyl-phenol];
   (e) methylene-2-[4-tert-octyl-6-(2H-benzotriazol-2-yl)phenol]2'-[4-tert-octyl-6-(5-trifluoromethyl-2H-benzotriazol-2-yl)phenol];
   (f) 3-(5-trifluoromethyl-2H-benzotiazol-2-yl)-5-tert-butyl-4-hydroxy-hydrocinnamic acid;
   (g) methyl 3-(5-trifluoromethyl-2H-benzottiazol-2-yl)-5-tert-butyl4-hydroxy-hydrocinnamate;
   (h) isooctyl 3-(5-trifluoromethyl-2H-benzotriazol-2-yl)-5-tert-butyl-4-hydroxy-hydrocinnamate;
   (i) 5-trifluoromethyl-2-[2-hydroxy-5-(3-hydroxypropyl)phenyl]-2H-benzotriazole;
   (n) 5-trifluoromethyl-2-(2-hydroxy-3-α-cumyl-5-tert-butylphenyl)-2H-benzo-triazole;
   (o) 5-trifluoromethyl-2-(2-hydroxy-3-α-cumyl-5-nonylphenyl)-2H-benzotriazole;
   (p) 5-trifluoromethyl-2-[2-hydroxy-3-α-cumyl-5-(2-hydroxyethyl)phenyl]-2H-benzotriazole;
   (q) 5-trifluoromethyl-2-[2-hydroxy-3-α-cumyl-5-(3-hydroxypropyl)phenyl]-2H-benzotriazole;
   (r) 5-trifluoromethyl-2-(2-hydroxy-3,5-di-tert-amylphenyl)-2H-benzotriazole;
   (s) 5-trifluoromethyl-2-(2-hydroxy-3,5-di-tert-butylphenyl)-2H-benzotriazole;
   (t) 5-trifluoromethyl-2-(2-hydroxy-3-dodecyl-5-methylphenyl)-2H-benzotriazole;
   (u) 5-trifluoromethyl-2-[2-hydroxy-3-tert-butyl-5-(3-hydroxypropyl)phenyl)-2H-benzotriazole;
   (v) 5-trifluoromethyl-2-[2-hydroxy-3-tert-butyl-5-(2-hydroxyethyl)phenyl]-2H-benzotriazole;
   (w) 5-trifluoromethyl-2-[2-hydroxy-5-(2-hydroxyethyl)phenyl]-2H-benzotriazole; or
   (x) 5-trifluoromethyl-2-(2-hydroxy-3,5-di-α-cumylphenyl)-2H-benzotriazole.

10. A composition according to claim 9 wherein the benzotriazole is
   (a) 5-trifluoromethyl-2-(2-hydroxy-3-α-cumyl-5-tert-octylphenyl)-2H-benzo-triazole;
   (b) 5-trifluoromethyl-2-(2-hydroxy-5-tert-octylphenyl)-2H-benzotriazole;
   (c) 5-trifluoromethyl-2-(2-hydroxy-3,5-di-tert-octylphenyl)-2H-benzotriazole;
   (g) methyl 3-(5-trifluoromethyl-2H-benzotriazol-2-yl)-5-tert-butyl-4-hydroxy-hydrocinnamate;
   (n) 5-trifluoromethyl-2-(2-hydroxy-3-α-cumyl-5-tert-butylphenyl)-2H-benzo-triazole;
   (s) 5-trifluorometbyl-2-(2-hydroxy-3,5-di-tert-butylphenyl)-2H-benzotriazole; or
   (x) 5-trifluoromethyl-2-(2-hydroxy-3,5-di-α-cumylphenyl)-2H-benzotriazole.

11. A composition according to claim 1 wherein the effective stabilizing amount of a benzotriazole of formula I, II or III is 0.1 to 20% by weight based on the adhesive.

12. A composition according to claim 1 wherein the adhesive of component (a) is selected from the group consisting of the pressure sensitive adhesives, the rubber-based adhesives, the solvent or emulsion based adhesives, the hot melt adhesives and natural-product based adhesives.

13. A composition according to claim 1 wherein the adhesive of component (a) is a polyacrylate.

14. A composition according to claim 1 which additionally contains from 0.01 to 10% by weight based on the adhesive of a coadditive which is selected from the group consisting of the antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents and blowing agents.

15. A composition according to claim 14 wherein the amount of coadditive is from 0.025 to 5% by weight based on the adhesive.

16. A composition according to claim 15 wherein the amount of coadditive is from 0.1 to 3% by weight based on the adhesive.

17. A composition according to claim 1 which additionally contains optional coadditives selected from the group consisting of plasticizers, adhesion promoters, waxes, petroleum waxes, elastomers, tackifier resins, oils, resins, polymers, rosin, modified rosin, hydrocarbon resins, terpene resins, paraffin wax, microcrystalline wax, synthetic hard wax and/or polyethylene wax.

* * * * *